(12) United States Patent
Namiki et al.

(10) Patent No.: US 11,378,684 B2
(45) Date of Patent: Jul. 5, 2022

(54) RADAR DEVICE AND OBJECT DETECTING METHOD FOR RADAR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Hajime Namiki, Tokyo (JP); Hiroyuki Kobayashi, Tokyo (JP); Eisuke Otani, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 10 days.

(21) Appl. No.: 16/893,008

(22) Filed: Jun. 4, 2020

(65) Prior Publication Data

US 2020/0301006 A1    Sep. 24, 2020

Related U.S. Application Data

(63) Continuation of application No. PCT/JP2014/047797, filed on Dec. 26, 2018.

(30) Foreign Application Priority Data

Dec. 28, 2017 (JP) .............................. JP2017-253377

(51) Int. Cl.
*G01S 13/931* (2020.01)
*B60R 11/00* (2006.01)
(Continued)

(52) U.S. Cl.
CPC .......... *G01S 13/931* (2013.01); *B60R 11/00* (2013.01); *G01S 7/282* (2013.01); *G01S 7/285* (2013.01);
(Continued)

(58) Field of Classification Search
CPC ........ G01S 13/931; G01S 7/282; G01S 7/285; G01S 13/872; G01S 2013/93275;
(Continued)

(56) References Cited

U.S. PATENT DOCUMENTS 7,057,550 B1 *   6/2006  Aker .................... G01S 13/348
                                                              342/194
7,146,148 B2 * 12/2006  Ide ........................... H04B 1/30
                                                              455/302

(Continued)

FOREIGN PATENT DOCUMENTS

JP      2005-315738 A    11/2005
JP       2012-2797 A      1/2012
JP      2015-40765 A      3/2015

OTHER PUBLICATIONS

International Search Report dated Mar. 19, 2019 in PCT/JP2018/047797 filed Dec. 26, 2018, 2 pages.
(Continued)

*Primary Examiner* — Olumide Ajibade Akonai
*Assistant Examiner* — Alexander L. Syrkin
(74) *Attorney, Agent, or Firm* — Oblon, McClelland, Maier & Neustadt, L.L.P.

(57) ABSTRACT

Provided is a radar device including: a transmission circuit that transmits a first transmission signal and a second transmission signal which have frequencies different from each other; a reception circuit that receives the first transmission signal and the second transmission signal which are reflected by one or a plurality of objects as a first reception signal and a second reception signal, a processor, and a memory that stores a command group executable by the processor. Quadrature demodulation is performed with respect to each of the first reception signal and the second reception signal, at least one of the first reception signal and the second reception signal is rotated on an IQ plane in
(Continued)

correspondence with a predetermined phase angle corresponding to a predetermined distance, and the first frequency or the second frequency, the first reception signal and the second reception signal of which one is rotated is added or subtracted, and the one or plurality of objects are detected on the basis of a processing result of a processing means.

11 Claims, 18 Drawing Sheets

(51) Int. Cl.
*G01S 7/282* (2006.01)
*G01S 7/285* (2006.01)
*G01S 13/87* (2006.01)

(52) U.S. Cl.
CPC .............. *G01S 13/872* (2013.01); *G01S 2013/93275* (2020.01)

(58) Field of Classification Search
CPC .......... G01S 2013/9315; G01S 2013/93272; G01S 2013/93274; G01S 7/2886; G01S 7/358; G01S 7/038; G01S 7/2921; G01S 7/2926; G01S 13/18; G01S 13/26; G01S 13/30; G01S 13/38; G01S 7/2923; G01S 13/93; G01S 13/24; B60R 11/00
USPC .......................................................... 342/70
See application file for complete search history.

(56) References Cited

U.S. PATENT DOCUMENTS

| | | | | |
|---|---|---|---|---|
| 9,590,603 | B1* | 3/2017 | Allouche | H01Q 3/2682 |
| 10,128,886 | B1* | 11/2018 | Barnard | H04B 15/06 |
| 2004/0070532 | A1* | 4/2004 | Ishii | G01S 13/18 |
| | | | | 342/134 |
| 2005/0225479 | A1* | 10/2005 | Shirai | G01S 13/93 |
| | | | | 342/52 |
| 2007/0182528 | A1* | 8/2007 | Breed | B60W 30/16 |
| | | | | 348/148 |
| 2009/0015464 | A1* | 1/2009 | Fukuda | G01S 7/35 |
| | | | | 342/194 |
| 2009/0189740 | A1* | 7/2009 | Wiesner | G08C 17/02 |
| | | | | 340/10.3 |
| 2010/0237871 | A1 | 9/2010 | Allouche et al. | |
| 2013/0113646 | A1 | 5/2013 | Allouche et al. | |
| 2017/0090013 | A1* | 3/2017 | Paradie | G01S 7/2926 |
| 2017/0102459 | A1* | 4/2017 | Sakamoto | G01S 7/354 |
| 2017/0219691 | A1 | 8/2017 | Farmer et al. | |
| 2019/0212430 | A1* | 7/2019 | Akamine | G01S 7/352 |

OTHER PUBLICATIONS

Extended European Search Report dated Nov. 17, 2020 in European Patent Application No. 18896547.9, 8 pages.
European Office Action dated Sep. 13, 2021 in European Patent Application No. 18896547.9, 4 pages.

* cited by examiner

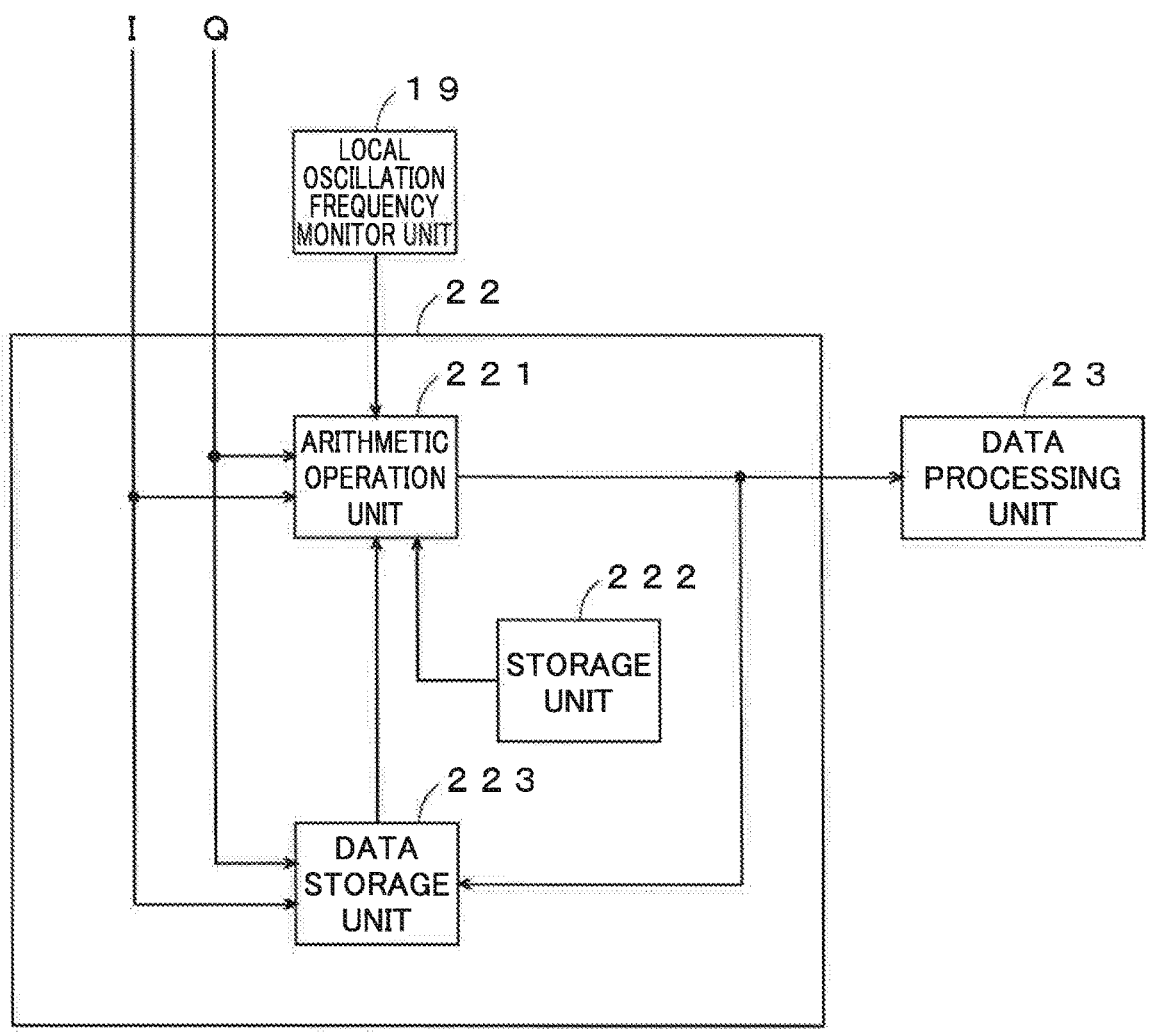

RADAR DEVICE AND OBJECT DETECTING METHOD FOR RADAR DEVICE

FIELD

The present invention relates to a radar device and an object detecting method for a radar device.

BACKGROUND

Patent Document 1 discloses a technology relating to a radar device in which an intensity modulation unit is disposed between a voltage control oscillator (VCO) and a transmission antenna, a carrier wave is modulated by the intensity modulation unit to generate a pulse signal, and detects an object by the pulse signal.

Patent Document 1: Japanese Unexamined Patent Application, Publication No. 2015-40765

SUMMARY

Problems to be Solved by the Invention

However, in the technology disclosed in Patent Document 1, in a case where objects closely exist, there is a problem that it is difficult to discriminate the objects.

In addition, a pulse signal that is transmitted is limited to a single-peak type waveform signal (for example, Gaussian function type waveform signal) on a time axis. Since the pulse signal becomes a Gaussian function type waveform even on a frequency axis, a central frequency component is the greatest, and the intensity is further lowered as it approaches an end of a band. As a result, since a usable frequency band is not effectively used, there is a problem that a pulse width on a time axis is widened and distance resolution is reduced.

An object of the invention is to provide a radar device and an object detecting method for a radar device which are capable of discriminating closely existing objects and are capable of improving distance resolution.

Means for Solving the Problems

To accomplish the object, according to the invention, there is provided a radar device including: a transmission means that transmits at least a first transmission signal having a first frequency and a second transmission signal having a second frequency different from the first frequency; a reception means that receives the first transmission signal and the second transmission signal which are transmitted by the transmission means and are reflected by one or a plurality of objects as a first reception signal and a second reception signal; a quadrature demodulation means that performs quadrature demodulation with respect to each of the first reception signal and the second reception signal which are output from the reception means; a rotation means that rotates at least one of the first reception signal and the second reception signal which are subjected to the quadrature demodulation on an IQ plane in correspondence with a predetermined phase angle corresponding to a predetermined distance up to a predetermined object among the one or plurality of objects, and the first frequency or the second frequency; a processing means that adds or subtracts the first reception signal and the second reception signal of which at least one is rotated by the rotation means; and a detection means that detects the one or plurality of objects on the basis of a processing result of the processing means. According to the configuration, it is possible to discriminate objects which closely exist, and it is possible to improve distance resolution.

In addition, in the invention, the processing means may execute processing of adding the first reception signal and the second reception signal of which at least one is rotated by the rotation means so as to highlight a predetermined object among the one or plurality of objects. According to the configuration, it is possible to perform detection by highlighting the predetermined object.

In addition, in the invention, the processing means may execute processing of subtracting the first reception signal and the second reception signal of which at least one is rotated by the rotation means so as to suppress a predetermined object among the one or plurality of objects. According to the configuration, it is possible to perform detection by suppressing a predetermined object.

In addition, in the invention, the radar device may further include a storage means that stores information indicating a phase to be rotated with respect to each of the one or plurality of objects. The rotation means may rotate a phase of at least one of the first reception signal and the second reception signal on the basis of the information. According to the configuration, with regard to an object of which a distance is known in advance, it is possible to perform detection by simply highlighting or suppressing the object.

In addition, in the invention, the reception means may receive inflow signals of the first transmission signal and the second transmission signal from the transmission means to the reception means as the first reception signal and the second reception signal, a storage means that stores information indicating a phase to be rotated with respect to the inflow signals may be provided, the rotation means may rotate a phase of at least one of the first reception signal and the second reception signal on the basis of the information, and the processing means may execute processing of calculating a difference between the first reception signal and the second reception signal of which at least one is rotated by the rotation means so as to suppress the inflow signal. According to the configuration, it is possible to suppress the inflow signals.

In addition, in the invention, the one or plurality of objects may include a bumper of a vehicle. According to the configuration, it is possible to perform detection by suppressing a signal that flows into through the bumper.

In addition, in the invention, a transmission signal transmitted from the transmission means may be a multi-peak type transmission signal in which a signal in a time region has a plurality of peaks. According to the configuration, it is possible to detect an object by using the multi-peak type transmission signal.

In addition, in the invention, the multi-peak type transmission signal may have a Sinc function type waveform. According to the configuration, it is possible to improve resolution relating to a distance by narrowing a pulse width on a time axis.

In addition, according to the invention, there is provided a radar device including: a transmission means that transmits at least a first transmission signal having a first frequency and a second transmission signal having a second frequency different from the first frequency; a reception means that receives the first transmission signal and the second transmission signal which are transmitted by the transmission means and are reflected by one or a plurality of objects as a first reception signal and a second reception signal; a processing means that performs predetermined processing with respect to each of the first reception signal and the second reception signal which are output from the reception means, and highlights or suppresses a predetermined object among the one or plurality of objects; and an output means that outputs information obtained by the processing means. According to the configuration, it is possible to perform detection by highlighting or suppressing a predetermined object.

In addition, according to the invention, there is provided an object detecting method for radar device, including: a transmission step of transmitting at least a first transmission signal having a first frequency and a second transmission signal having a second frequency different from the first frequency; a reception step of receiving the first transmission signal and the second transmission signal which are transmitted in the transmission step and are reflected by one or a plurality of objects as a first reception signal and a second reception signal; a quadrature demodulation step of performing quadrature demodulation with respect to each of the first reception signal and the second reception signal which are output in the reception step; a rotation step of rotating at least one of the first reception signal and the second reception signal which are subjected to the quadrature demodulation on an IQ plane in correspondence with a predetermined phase angle corresponding to a predetermined distance up to a predetermined object among the one or plurality of objects, and the first frequency or the second frequency; a processing step of adding or subtracting the first reception signal and the second reception signal of which at least one is rotated in the rotation step; and a detection step of detecting the one or plurality of objects on the basis of a processing result in the processing step. According to the method, it is possible to discriminate objects which closely exist, and it is possible to improve distance resolution.

Effects of the Invention

According to the invention, it is possible to provide a radar device and an object detecting method for a radar device which are capable of discriminating objects which closely exist, and are capable of improving distance resolution.

BRIEF DESCRIPTION OF THE DRAWINGS

FIG. 2 is a diagram illustrating a detailed configuration example of a signal processing unit of the radar device illustrated in FIG. 1.

FIG. 3 is an example of a table that is stored in a storage unit illustrated in FIG. 1.

DETAILED DESCRIPTION

Next, an embodiment of the invention will be described.

Figure 1:
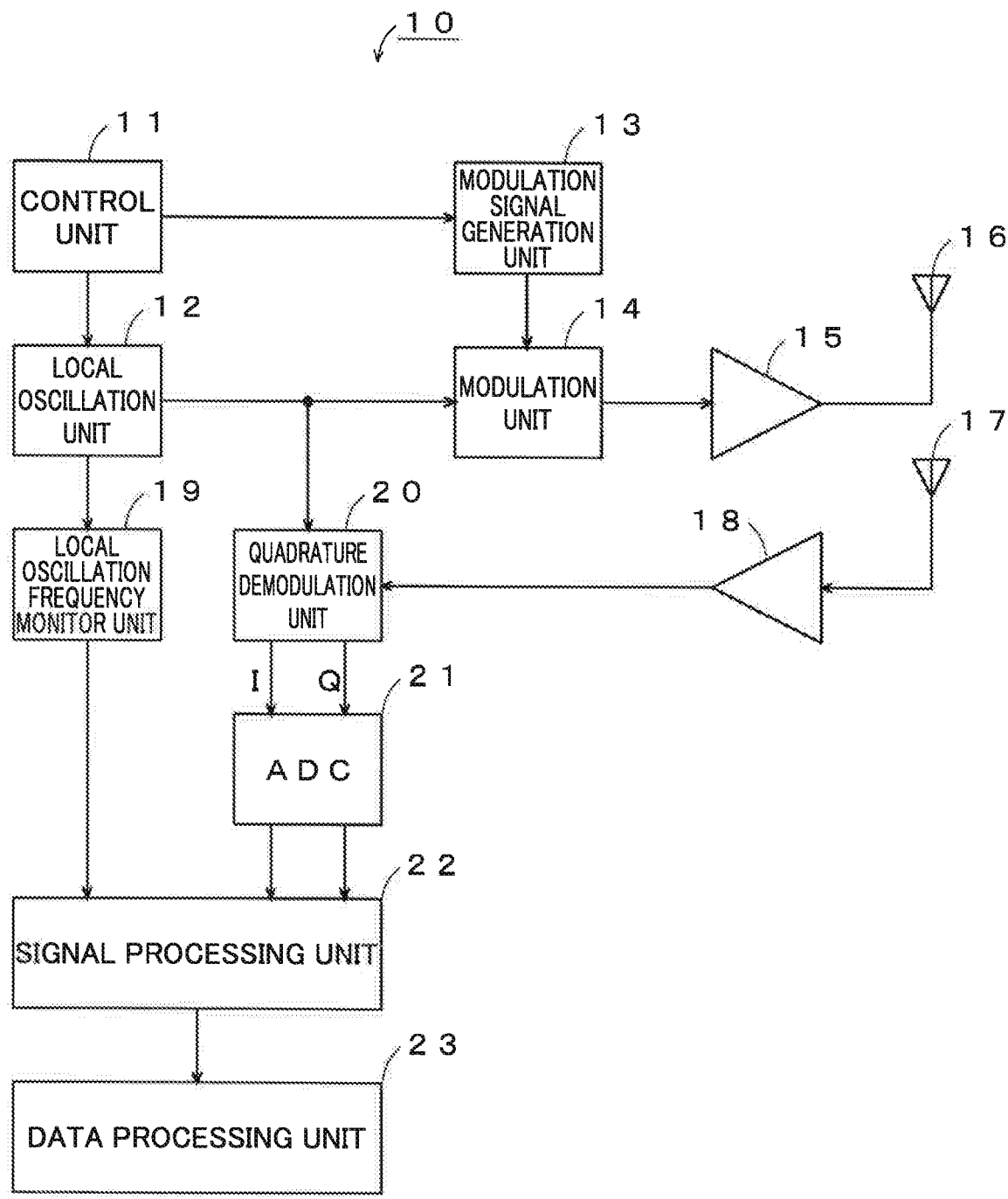
FIG. 1 is a diagram illustrating a configuration example of a radar device according to an embodiment of the invention.

(A) FIG. 1 which describes the configuration of the embodiment of the invention is a diagram illustrating a configuration example of a radar device according to an embodiment of the invention. As illustrated in the drawing, for example, a radar device 10 according to the embodiment of the invention is mounted on a vehicle such as an automobile, and detects an object such as a vehicle, a pedestrian, and an obstacle which exist at the periphery of the vehicle.

Here, the radar device 10 includes a control unit 11, a local oscillation unit 12, a modulation signal generation unit 13, a modulation unit 14, amplification units 15 and 18, a transmission antenna 16, a reception antenna 17, a local oscillation frequency monitor unit 19, a quadrature demodulation unit 20, an analog to digital converter (ADC) 21, a signal processing unit 22, and a data processing unit 23 as main components.

The control unit 11 controls respective units of the radar device 10, and controls a frequency of a local oscillation signal generated by the local oscillation unit 12.

The local oscillation unit 12 generates a local oscillation signal of a frequency corresponding to control by the control unit 11 and outputs the local oscillation signal.

The modulation signal generation unit 13 generates a modulation signal for modulating the local oscillation signal supplied from the local oscillation unit 12 to a pulse waveform, and supplies the modulation signal to the modulation unit 14. Note that, for example, phase modulation or frequency modulation may be performed in addition to the pulse modulation.

The modulation unit 14 modulates the local oscillation signal supplied from the local oscillation unit 12 on the basis of the modulation signal supplied from the modulation signal generation unit 13, and supplies the resultant modulated signal to the amplification unit 15.

The amplification unit 15 amplifies power of the pulse signal supplied from the modulation unit 14, and supplies the resultant pulse signal to the transmission antenna 16.

The transmission antenna 16 transmits the pulse signal supplied from the amplification unit 15 toward an object as electromagnetic wave.

The reception antenna 17 captures the electromagnetic wave (reflection signal) reflected by the object, converts the electromagnetic wave into an electric signal, and supplies the electric signal to the amplification unit 18. The amplification unit 18 amplifies power of the electric signal supplied from the reception antenna 17, and supplies the resultant electric signal to the quadrature demodulation unit 20.

The quadrature demodulation unit 20 down-converts (frequency conversion into a low frequency) the electric signal supplied from the amplification unit 18 by the local oscillation signal supplied from the local oscillation unit 12, and performs quadrature demodulation with mutually orthogonal signals, and supplies I and Q components which are obtained to the ADC 21.

The ADC 21 converts the I and Q components as analog signals supplied from the quadrature demodulation unit 20 into digital data, and outputs the digital data.

The signal processing unit 22 performs predetermined signal processing with respect to the digital data supplied from the ADC 21, and supplies an obtained result to the data processing unit 23.

The data processing unit 23 performs clustering processing, tracking processing, and the like with respect to the digital data supplied from the signal processing unit 22, and executes processing of detecting an object. Note that, information relating to a detected object is supplied to a higher device (for example, an electric control unit (ECU)) (not illustrated).

FIG. 2 illustrates a detailed configuration example of the signal processing unit 22 illustrated in FIG. 1. In the example illustrated in FIG. 2, the signal processing unit 22 includes an arithmetic operation unit 221, a storage unit 222, and a data storage unit 223.

Here, the arithmetic operation unit 221 processes the digital data supplied from the ADC 21 on the basis of information indicating a frequency of the local oscillation signal which is supplied from the local oscillation frequency monitor unit 19, and supplies the resultant data to the data processing unit 23.

The storage unit 222 stores data such as a table in which information corresponding to a phase when detecting an object at a predetermined frequency is accommodated and which is referred to when the arithmetic operation unit 221 performs arithmetic operation processing. The data storage unit 223 stores data that is a target of the arithmetic operation processing by the arithmetic operation unit 221 and data that is generated as a result of the arithmetic operation processing. An example of the information table stored in the storage unit 222 is illustrated in FIG. 3. In the example illustrated in FIG. 3, each object and a distance up to the object are stored in association with each other.

(B) Description of Operation of Embodiment

Next, an operation of the embodiment of the invention will be described. Hereinafter, a detailed operation of the embodiment will be described after describing an operation principle of the embodiment of the invention.

Figure 4A:
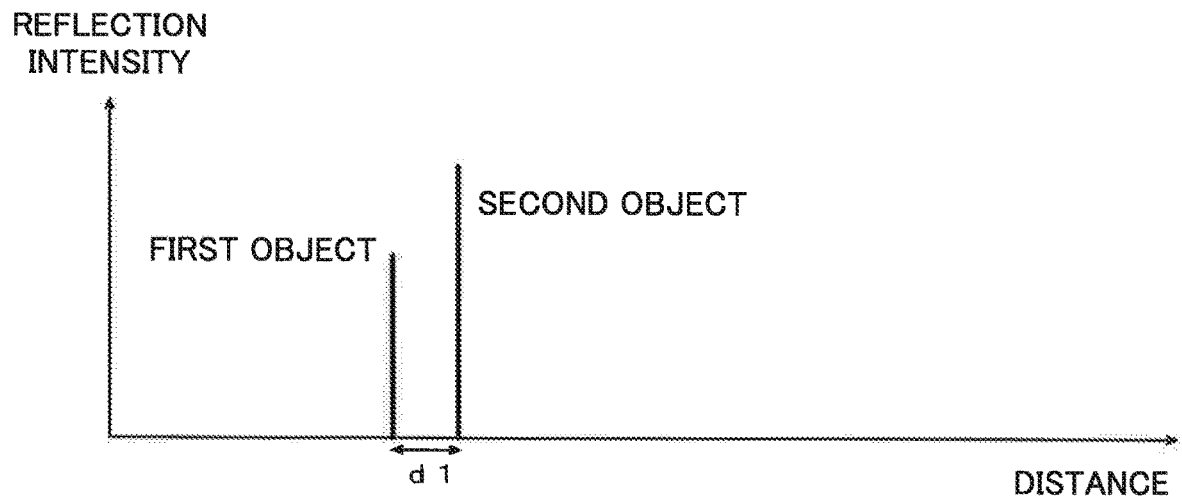
FIG. 4A is graphs illustrating an operation of the embodiment illustrated in FIG. 1.
Figure 4B:
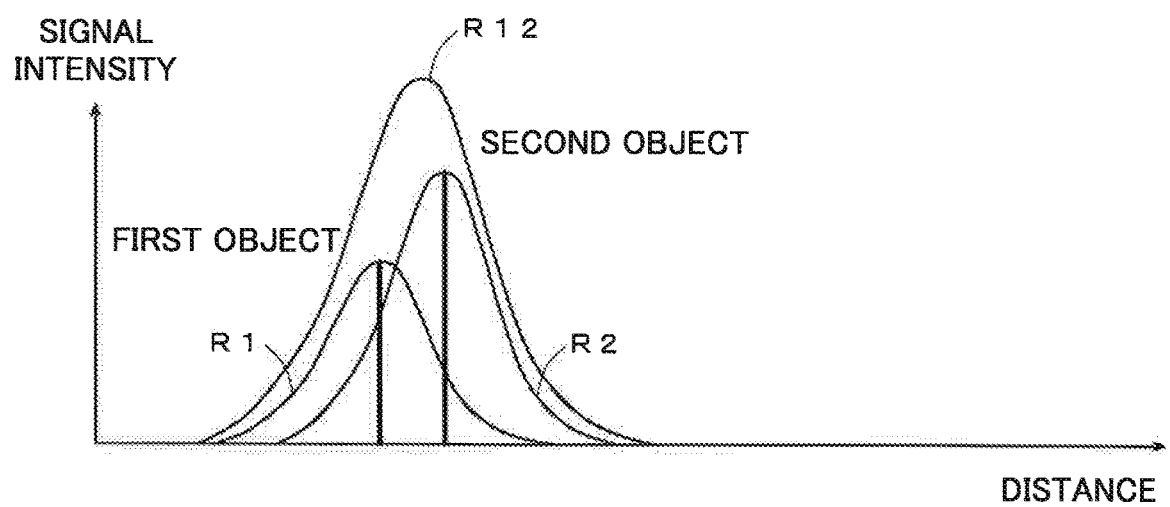
FIG. 4B is graphs illustrating an operation of the embodiment illustrated in FIG. 1.

First, the operation principle of the invention will be described with reference to FIGS. 4A to 7C. FIG. 4A illustrates a case where two objects including a first object part and a second object exist with a distance d1. Note that, in FIG. 4A, the horizontal axis represents a distance, and the vertical axis represents reflection intensity of a reflection signal that is reflected from the object. In FIG. 4A, in a case where the distance d1 is less than resolution of the radar device, it is difficult to discriminate the first object and the second object from each other. That is, as illustrated in FIG. 4B, the radar device cannot distinguish a reflection signal R1 from the first object and a reflection signal R2 from the second object, and detects a reflection signal R12 as a composite wave of the signals. Note that, in FIG. 4B, the horizontal axis represents a distance, and the vertical axis represents signal intensity.

Figure 5A:
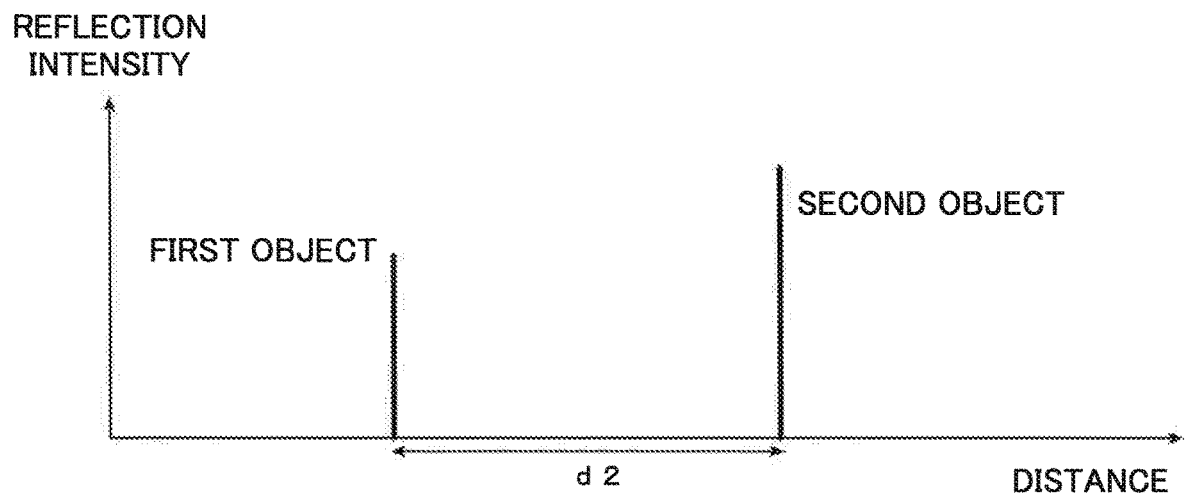
FIG. 5A is graphs illustrating the operation of the embodiment illustrated in FIG. 1.
Figure 5B:
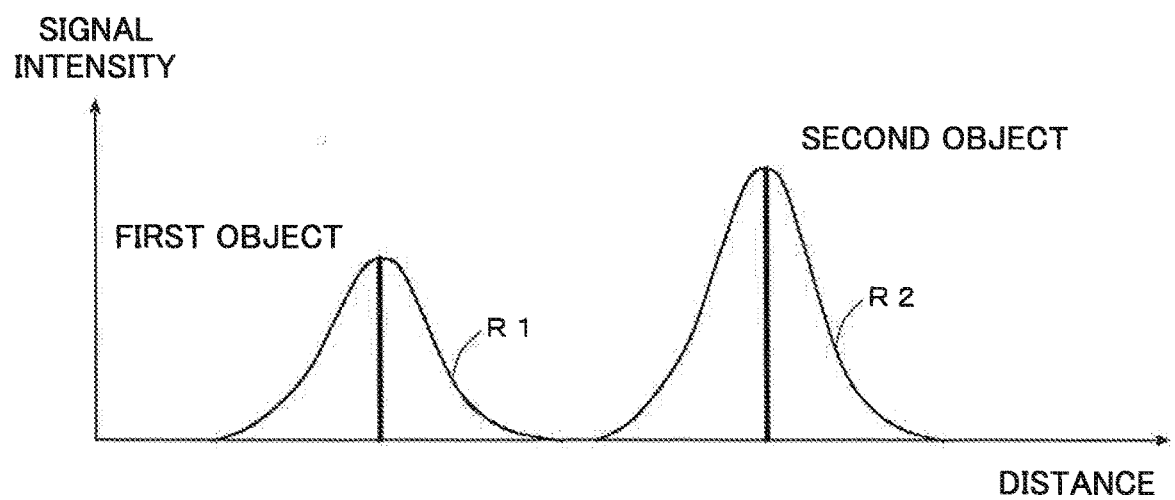
FIG. 5B is graphs illustrating the operation of the embodiment illustrated in FIG. 1.

FIG. 5A illustrates an example in a case where the first object and the second object exist with a distance d2 equal to or greater than the resolution of the radar device. In this case, as illustrated in FIG. 5B, the reflection signal R1 from the first object and the reflection signal R2 from the second object do not overlap each other, and thus it is possible to easily discriminate the signals. According to this, the radar device can detect the objects as separate objects.

Figure 6A:
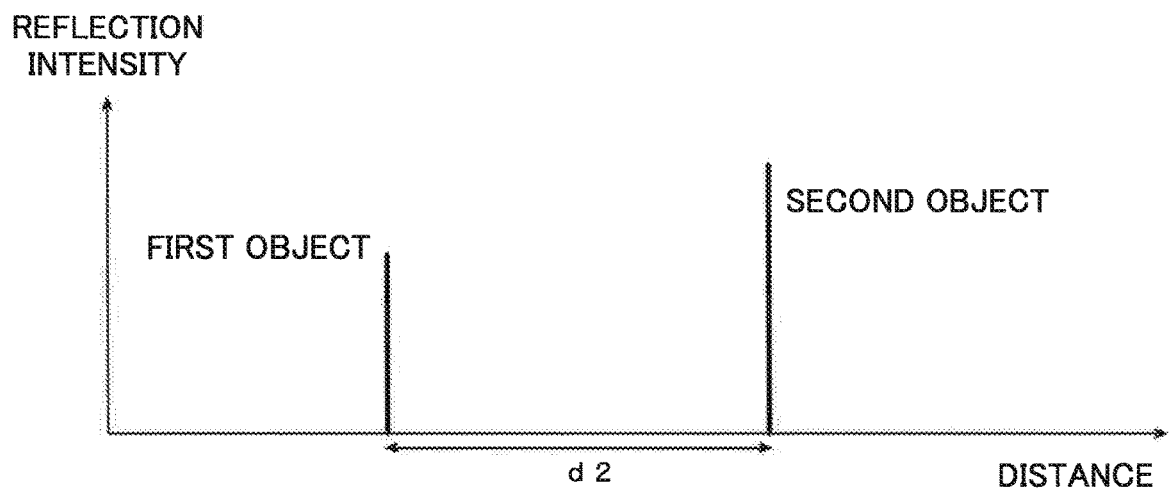
FIG. 6A is graphs illustrating the operation of the embodiment illustrated in FIG. 1.
Figure 6B:
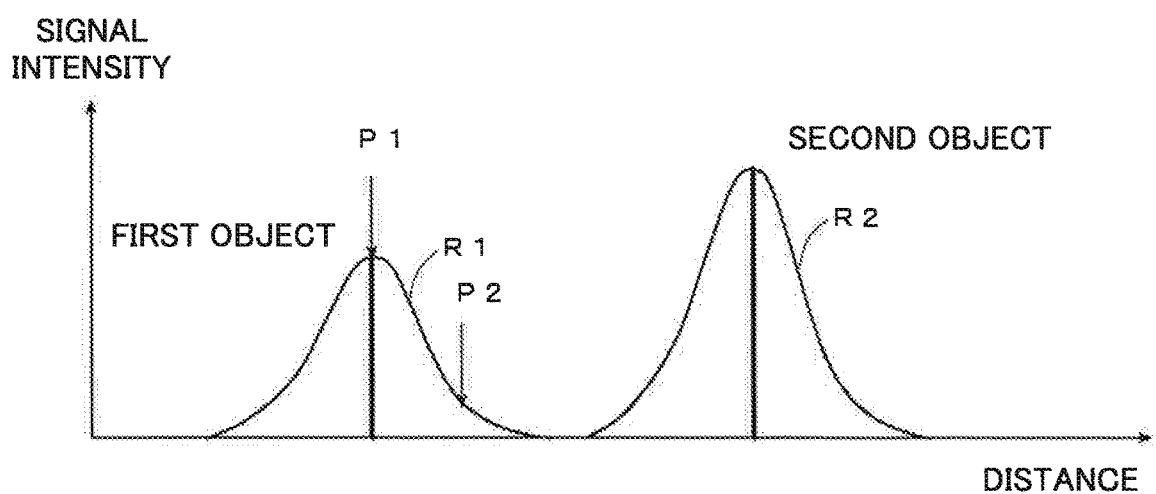
FIG. 6B is graphs illustrating the operation of the embodiment illustrated in FIG. 1.
Figure 6C:
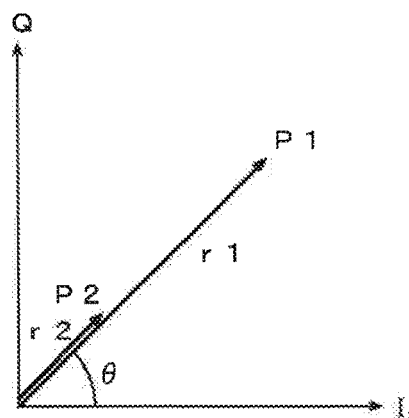
FIG. 6C is graphs illustrating the operation of the embodiment illustrated in FIG. 1.

By the way, in a case where the first object and the second object similar to FIG. 5 exist, as illustrated in FIG. 6B, attention is paid to P1 (a peak position of a waveform) and P2 (a bottom position of the waveform) of the reflection signal R1 from the first object. When performing quadrature demodulation with respect to the reflection signal R1 from the first object, a result as in FIG. 6C is obtained. In FIG. 6C, the horizontal axis represents an I (In-phase) component that is an in-phase component, and the vertical axis represents a Q (Quadrature) component that is a quadrature component. After being subjected to the quadrature demodulation, the reflection signal R1 is shown on an IQ plane, an amplitude of the reflection signal R1 corresponds to a radius r1, and a distance corresponds to a phase angle θ. Here, signal components of the reflection signal R1 at two positions including P1 and P2 are reflection signals from the first object, and thus the distance is the same in each case. Accordingly, the phase angle θ is the same in each case.

Figure 7A:
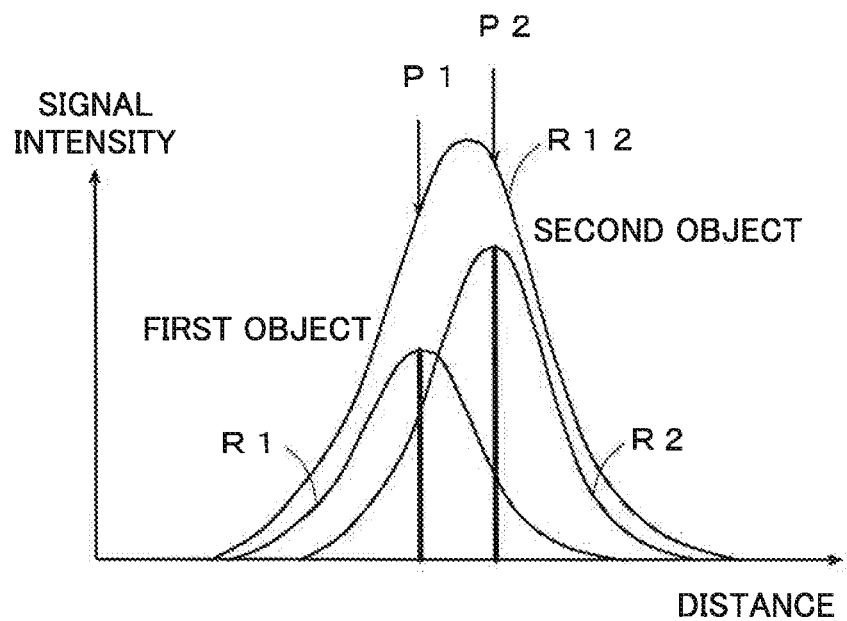
FIG. 7A is graphs illustrating the operation of the embodiment illustrated in FIG. 1.
Figure 7B:
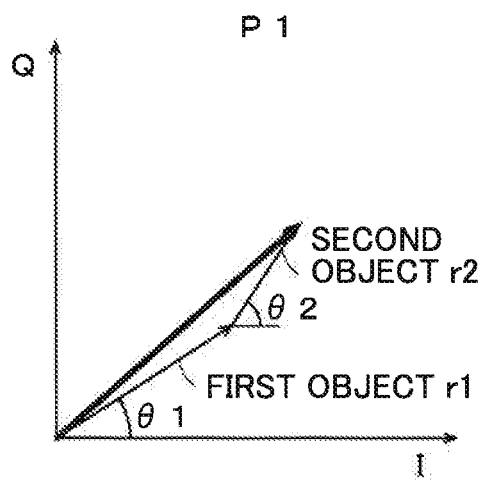
FIG. 7B is graphs illustrating the operation of the embodiment illustrated in FIG. 1.
Figure 7C:
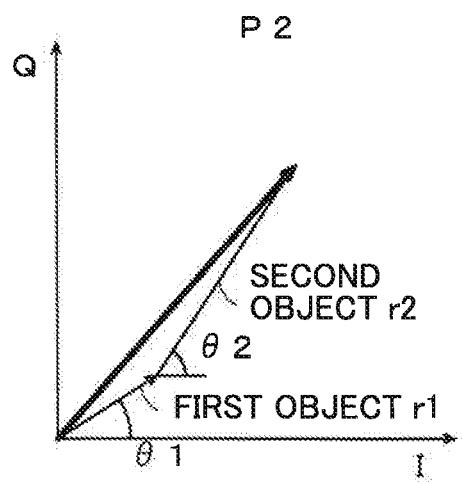
FIG. 7C is graphs illustrating the operation of the embodiment illustrated in FIG. 1.

FIG. 7A to FIG. 7C illustrates a result of the quadrature demodulation with respect to a reception signal in a case where the first object and the second object exist with a distance d less than the resolution as illustrated in FIG. 4A and FIG. 4B. More specifically, as illustrated in FIG. 7A, in a case where the reflection signal R1 from the first object and the reflection signal R2 from the second object are composed and the reflection signal R12 is generated, a result of quadrature demodulation for a reception signal at two points, P1 and P2 of the reflection signal R12 is illustrated in FIG. 7B and FIG. 7C.

FIG. 7B illustrates a result of the quadrature demodulation at P1. As illustrated in FIG. 7B, in the result of the quadrature demodulation at P1, a bold-line arrow illustrates a result obtained by composing a fine-line arrow having a radius r1 corresponding to amplitude of the reflection signal R1 from the first object at P1 and a phase angle θ1 corresponding to a distance of the first object, and a fine-line arrow having a radius r2 corresponding to amplitude of the reflection signal R2 from the second object at P1 and a phase angle θ2 corresponding to a distance of the second object.

FIG. 7C illustrates a result of the quadrature demodulation at P2. As illustrated in FIG. 7C, in the result of the quadrature demodulation at P2, a bold-line arrow illustrates a result obtained by composing a fine-line arrow having a radius r1 corresponding to amplitude of the reflection signal R1 from the first object at P2 and a phase angle θ1 corresponding to a distance of the first object, and a fine-line arrow having a radius r2 corresponding to amplitude of the reflection signal R2 from the second object at P2 and a phase angle θ2 corresponding to a distance of the second object.

As described above, even in a case where the reflection signals from objects different from each other are mixed, when performing the quadrature demodulation with respect to the signals, a phase of the reflection signal from each object is maintained. However, since a signal that is detected by the radar device is the reflection signal R12, it is difficult to discriminate the first object and the second object from each other.

Here, in the embodiment of the invention, since an object is detected by changing a frequency of a pulse signal, it is possible to discriminate the first object and the second object which are disposed with an interval d less than resolution of the radar device 10. This will be described below.

Figure 8:
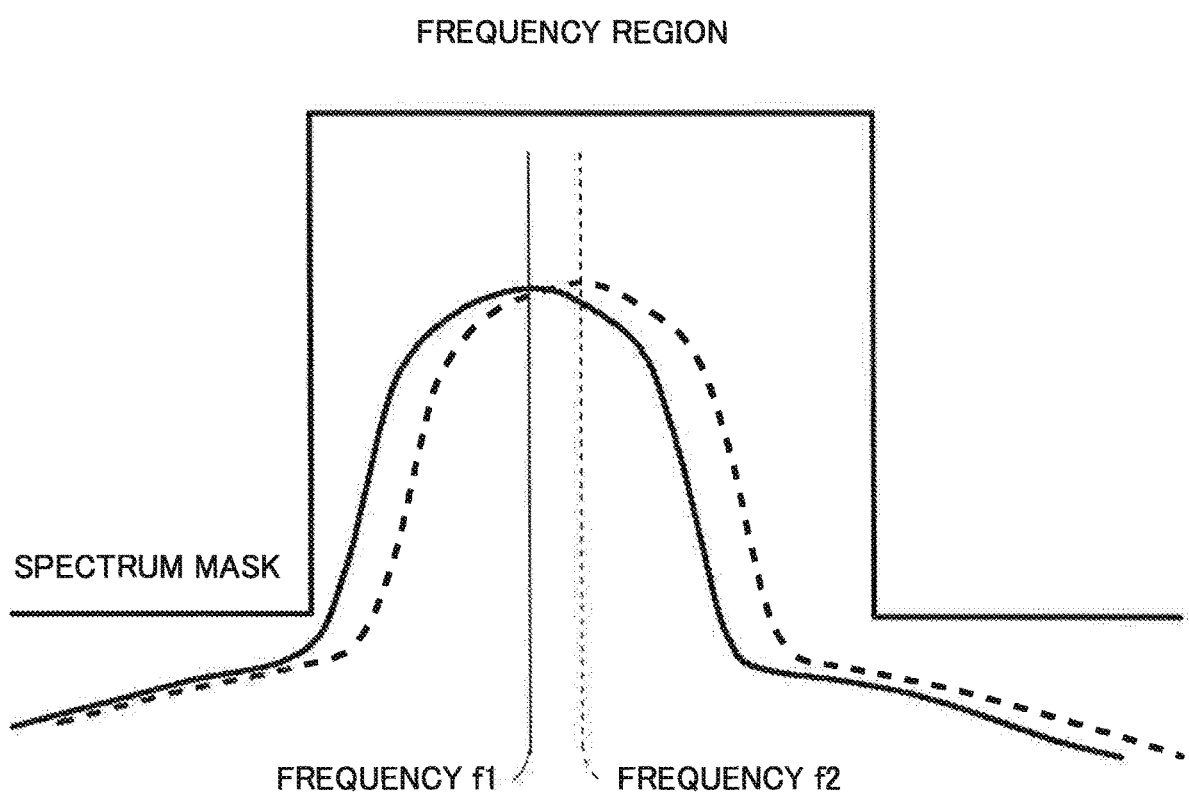
FIG. 8 is a graph illustrating the operation of the embodiment illustrated in FIG. 1.

It is assumed that the first object exists at a position spaced apart from the radar device 10 by a distance L1, and the second object exists at a position spaced apart from the radar device 10 by a distance L2. In addition, it is assumed that the radar device 10 transmits two kinds of pulse signals of a frequency f1 and a frequency f2, and a wave number with respect to the frequency f1 is set to k1 ($=2\pi f1/c$), and a wave number with respect to the frequency f2 is set to k2 ($=2\pi f2/c$). Note that, c represents a speed of light. FIG. 8 is a diagram illustrating a relationship between frequency characteristics of the pulse signals of the frequency f1 and the frequency f2, and a spectrum mask. As illustrated in FIG. 8, it is assumed that the pulse signals of the frequency f1 and the frequency f2 are shifted on a frequency axis, and enter the spectrum mask.

An arbitrary point on an IQ plane can be expressed by $A \times \exp(i\theta)$. Here, A represents amplitude, i represents an imaginary number, and θ represents a phase angle. In the following description, the amplitude A is set to "1" for simplification of explanation.

Figure 9A:
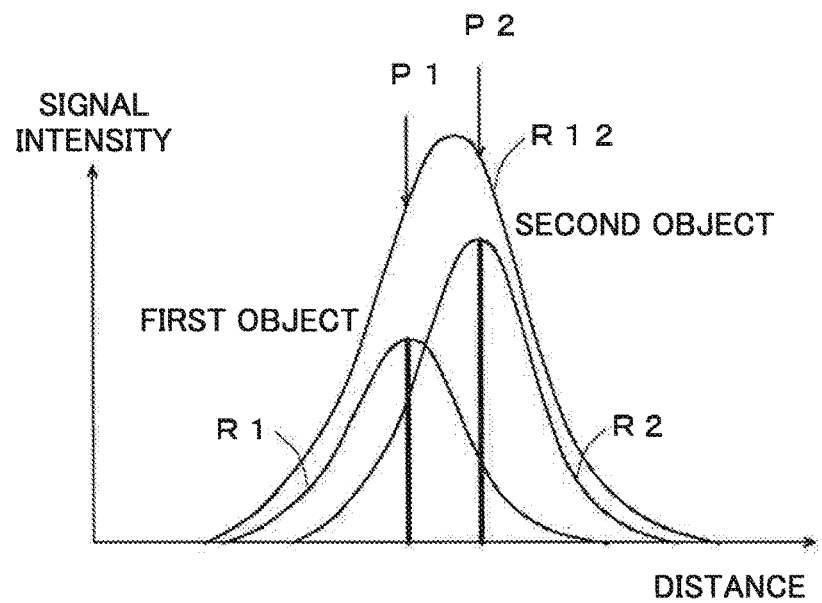
FIG. 9A is graphs illustrating the operation of the embodiment illustrated in FIG. 1.
Figure 9B:
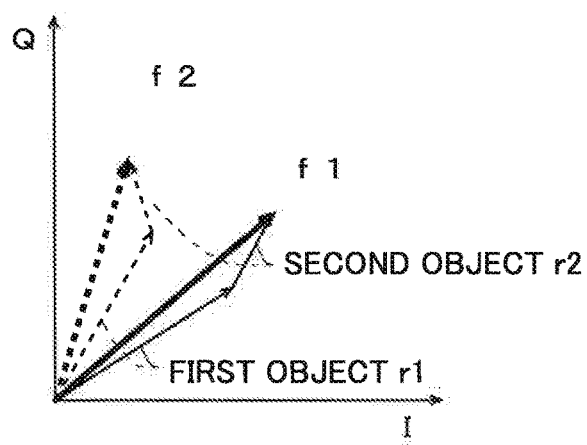
FIG. 9B is graphs illustrating the operation of the embodiment illustrated in FIG. 1.

In this case, in a case where a reflection signal R12 at P1 illustrated in FIG. 9A is subjected to the quadrature demodulation, as illustrated in FIG. 9B, a detection signal by the frequency f1 is expressed by the following Expression (1). Note that, a first term in Expression (1) corresponds to the solid fine-line arrow corresponding to the first object in FIG. 9B, and a second term in Expression (1) corresponds to the solid fine-line arrow corresponding to the second object in FIG. 9B.

$$\exp(i \times k1 \times L1) + \exp(i \times k1 \times L2) \quad (1)$$

In addition, in a case where the reflection signal R12 at P1 illustrated in FIG. 9A is subjected to the quadrature demodulation, as illustrated in FIG. 9B, a detection signal by the frequency f2 is expressed by the following Expression (2). Note that, a first term in Expression (2) corresponds to the broken fine-line arrow corresponding to the first object in FIG. 9B, and a second term in Expression (2) corresponds to the broken fine-line arrow corresponding to the second object in FIG. 9B.

$$\exp(i \times k2 \times L1) + \exp(i \times k2 \times L2) \quad (2)$$

When a relationship of $k2=k1+\Delta k$ is established, Expression (2) become the following Expression (3).

$$\exp(i \times k1 \times L1) + \exp(i \times \Delta k \times L1) + \exp(i \times k1 \times L2) + \exp(i \times \Delta k \times L2) \quad (3)$$

Figure 9C:
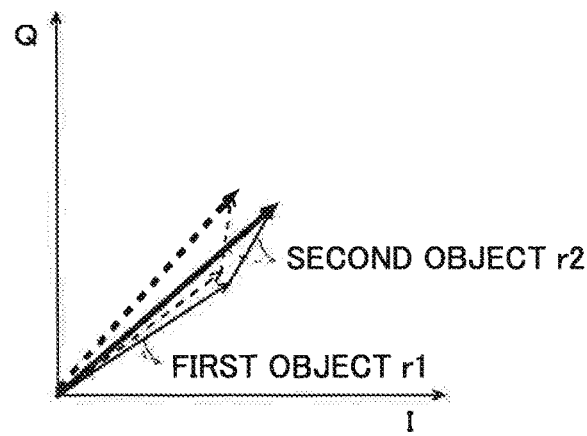
FIG. 9C is graphs illustrating the operation of the embodiment illustrated in FIG. 1.

Here, when Expression (3) is multiplied by $\exp(-i \times \Delta k \times L1)$, the following expression (4) is obtained. Note that, the configuration in which Expression (3) is multiplied by $\exp(-i \times \Delta k \times L1)$ represents that on the IQ plane, a detection result (bold broken-line arrow) by the frequency f2 illustrated in FIG. 9B is rotated in a clockwise direction up to the same phase angle as in a detection result (bold solid-line arrow) by the frequency f1 (refer to FIG. 9C)

$$\exp(i \times k1 \times L1) + \exp(i \times k1 \times L2) \times \exp(i \times \Delta k(L2-L1)) \quad (4)$$

When subtracting Expression (4) from Expression (1), the following Expression (5) is obtained.

$$\exp(i \times k2 \times L2) + \exp(i \times k1 \times L2) \times \exp(i \times \Delta k(L2-L1)) \quad (5)$$

In a case where L1 is known, the term relating to the first object can be erased, and thus it is possible to obtain only information relating to the second object.

Figure 10A:
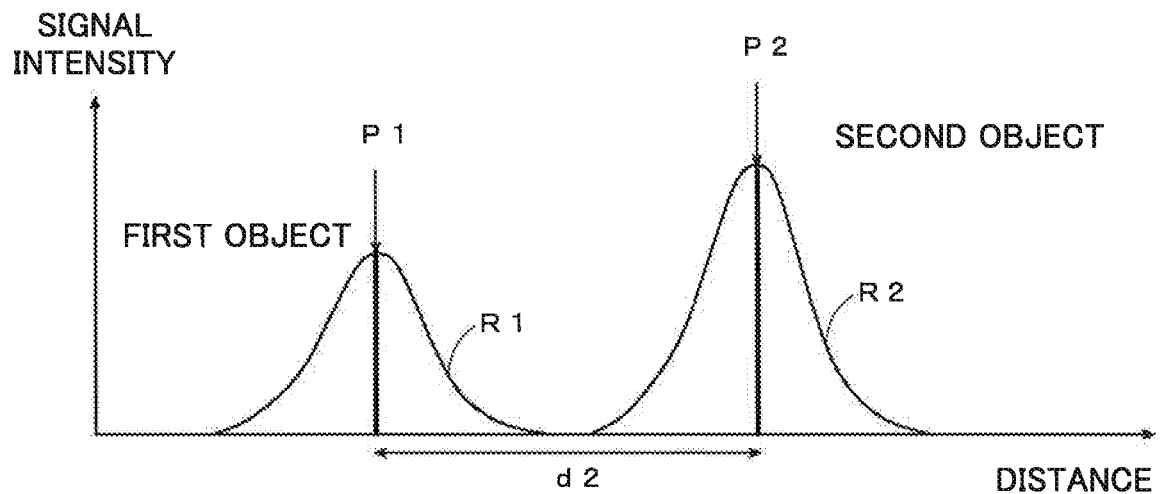
FIG. 10A is graphs illustrating the operation of the embodiment illustrated in FIG. 1.
Figure 10B:
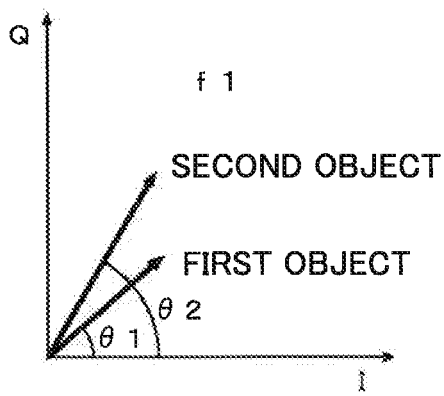
FIG. 10B is graphs illustrating the operation of the embodiment illustrated in FIG. 1.
Figure 10C:
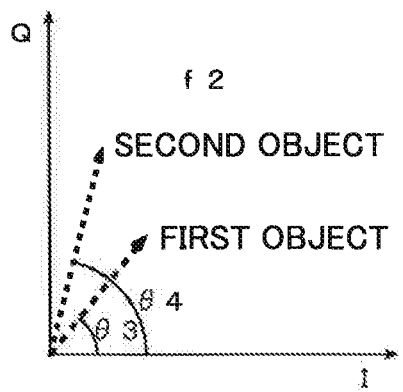
FIG. 10C is graphs illustrating the operation of the embodiment illustrated in FIG. 1.

Hereinbefore, description has been given of the operation principle for discriminating the first object and the second object in a case where the first object and the second object are disposed with a distance less than resolution. However, in addition to this, in this embodiment, of the first object and the second object which are disposed with a distance d2 that is equal to or greater than the resolution, (1) any one may be suppressed or (2) any one may be highlighted as illustrated in FIG. 10.

First, with regard to (1) the former method of suppressing any one, a detection operation by the frequency f1 is performed, a detection operation by the frequency f2 is performed, phase rotation processing is executed, and a difference between both the detection operations is calculated. According to this, a desired component can be suppressed, and the other component can be extracted.

More specifically, a detection signal by the frequency f1 is expressed by the following Expression (6).

$$\exp(i \times k1 \times L1) + \exp(i \times k1 \times L2) \quad (6)$$

In addition, a detection signal by the frequency f2 is expressed by the following Expression (7).

$$\exp(i \times k2 \times L1) + \exp(i \times k2 \times L2) = \exp(i \times k1 \times L1) \times \exp(i \times \Delta k \times L1) + \exp(i \times k1 \times L2) \times \exp(i \times \Delta k \times L2) \quad (7)$$

Here, when Expression (8) is multiplied by $\exp(-i \times \Delta k \times L1)$, the following Expression (8) is obtained.

$$= \exp(i \times k1 \times L1) + \exp(i \times k1 \times L2) \times (\exp(i \times \Delta k \times (L2-L1))) \quad (8)$$

When subtracting Expression (8) from Expression (6), the following Expression (9) is obtained.

$$\exp(i \times k1 \times L2)(1-\exp(i \times \Delta k \times (L2-L1))) \quad (9)$$

That is, it is possible to suppress a signal relating to the first object, and it is possible to extract a signal relating to the second object. When a radome of the radar device, a bumper of a vehicle on which the radar device is mounted, or the like is treated as the first object, it is possible to suppress a signal reflected from the members.

Note that, hereinbefore, description has been given on the assumption that the first object exists as a material for simplification of explanation, but for example, when a signal that directly flows into the reception antenna 17 from the transmission antenna 16 is treated as the signal corresponding to the first object, it is possible to suppress the inflow signal.

In addition, it is also possible to suppress a signal in combination with the radome of the radar device, the bumper of the vehicle on which the radar device is mounted, or the like.

Figure 11:
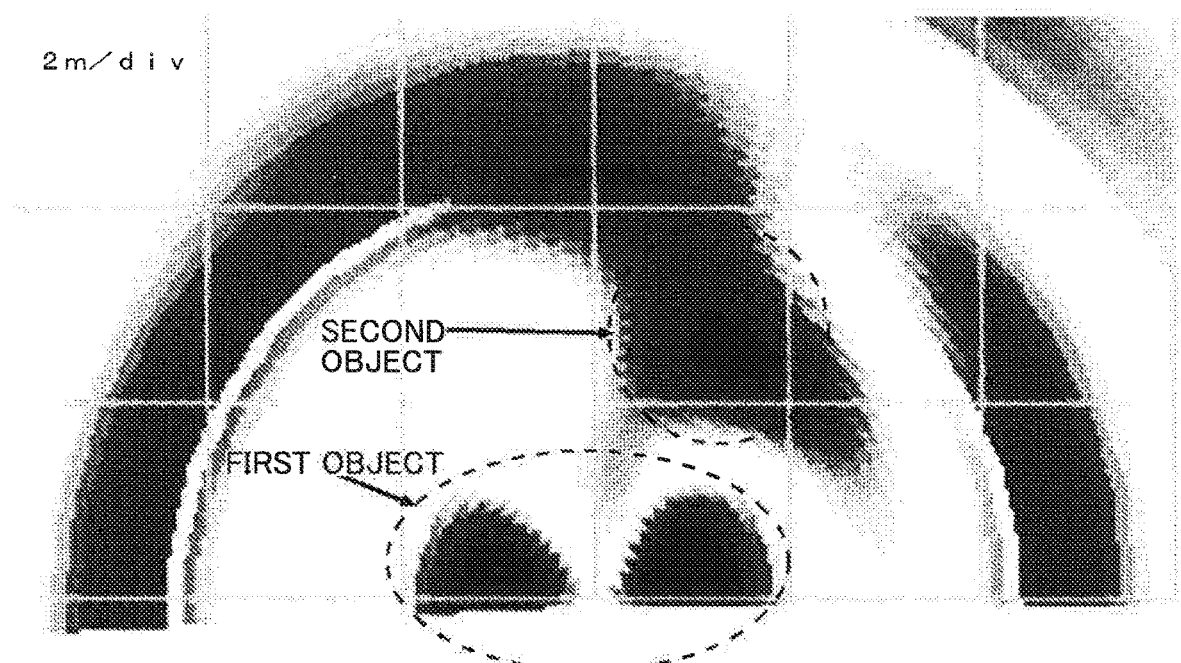
FIG. 11 is a view illustrating an actual measurement result of the embodiment illustrated in FIG. 1.
Figure 12:
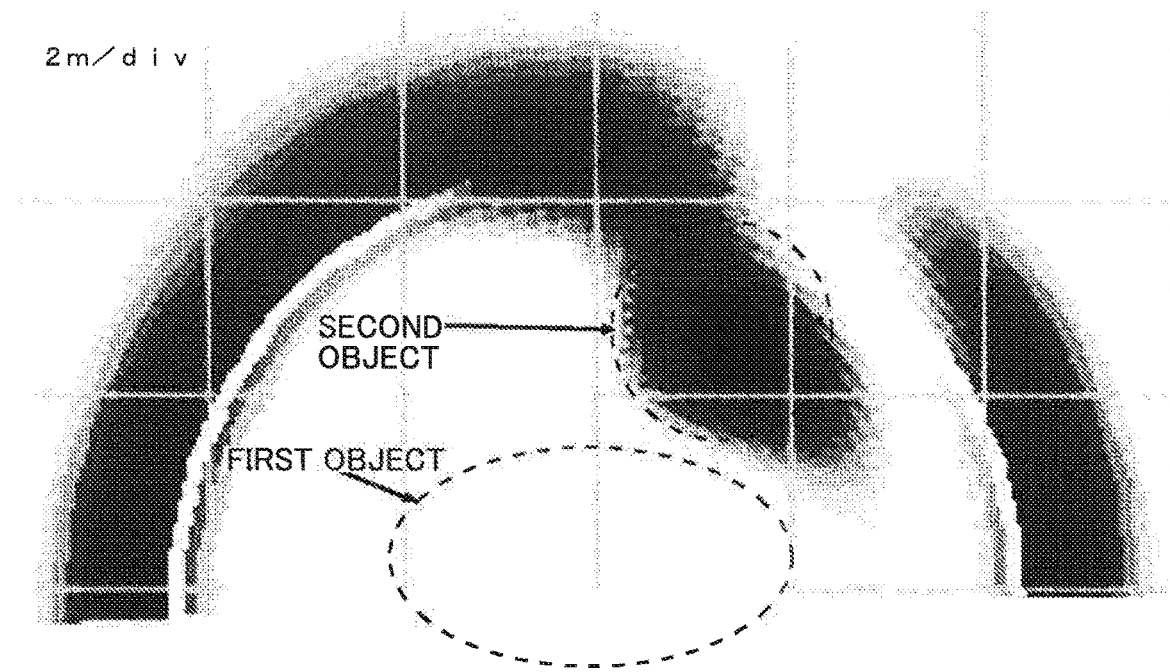
FIG. 12 is a view illustrating an actual measurement result of the embodiment illustrated in FIG. 1.
Figure 13:
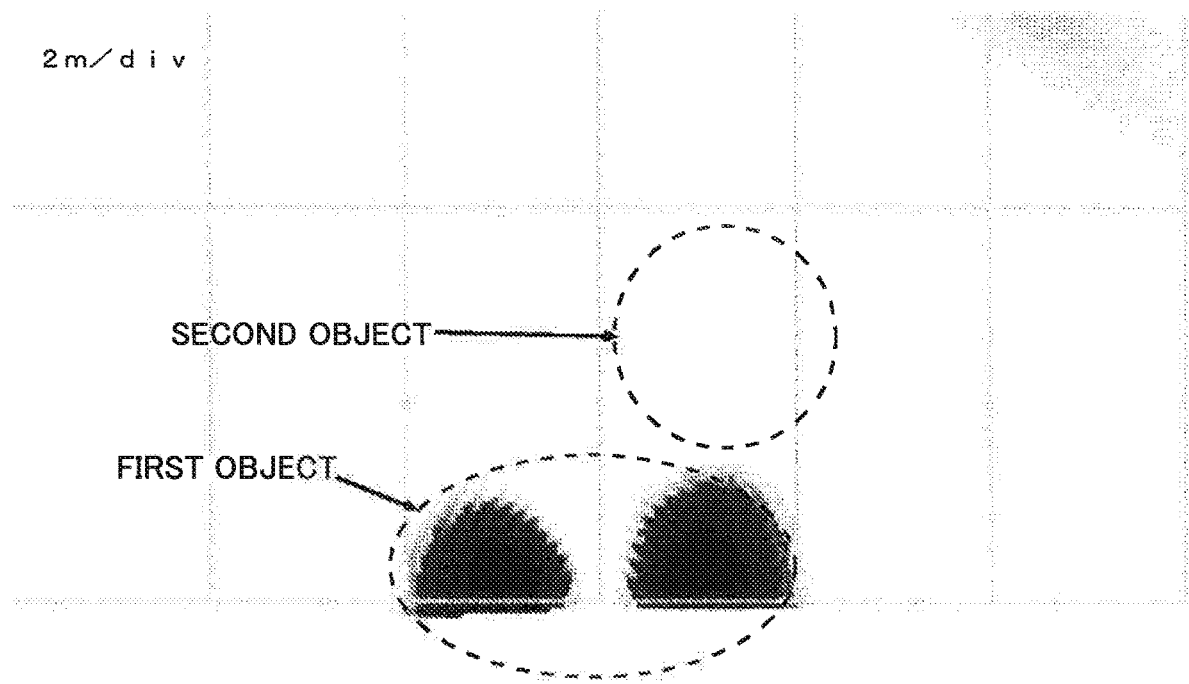
FIG. 13 is a view illustrating an actual measurement result of the embodiment illustrated in FIG. 1.

FIGS. 11 to 13 are views illustrating an actual measurement result of the embodiment of the invention. FIGS. 11 to 13 represent an actual measurement result of two pieces of the first object and the second object by using a transmission signal of 24 GHz which is used in a narrow band. Note that, in FIGS. 11 to 13, a dark color portion represents an object-detected region. First, FIG. 11 illustrates an actual measurement result in a case where processing according to this embodiment is not executed. In the example in FIG. 11, two pieces of the first object and the second object are detected.

Next, FIG. 12 illustrates an actual measurement result in a case where the first object is subjected to suppression processing. In the example in FIG. 12, a color of the first object that is a target of the suppression processing is dilute relatively to the second object that is not a target of the suppression processing.

From comparison between FIG. 11 and FIG. 12, the effect by this embodiment becomes clear from the actual measurement results.

Next, with regard to (2) the method of highlighting any one, a detection operation by the frequency f1 is performed, a detection operation is performed by the frequency f2, phase rotation processing is executed, and results of both the detection operations are added. According to this, it is possible to highlight a desired component.

More specifically, when the above-described Expression (6) and Expression (8) are added, the following Expression (10) is obtained.

$$2\times\exp(i\times k1\times L1)+\exp(i\times k1\times L2)\times(1+\exp(i\times\Delta k\times(L2-L1))) \quad (10)$$

That is, with regard to the first object having the same phase, a signal component becomes two times. However, with regard to the second object, since the phase is different, the signal component is less than two times. According to this, it is possible to highlight the component relating to the first object.

FIG. 13 illustrates an actual measurement result in a case where the first object is subjected to highlighting processing. In the example of FIG. 13, a color of the first object that is a target of the highlighting processing is darker relatively to the second object that is not a target of the highlighting processing.

From comparison between FIG. 11 and FIG. 13, the effect by this embodiment becomes clear from the actual measurement results.

As described above, according to this embodiment, it is possible to highlight or suppress a predetermined object of which a distance is known. Accordingly, for example, it is possible to suppress erroneous detection or the like due to a reflection wave from a radome that covers the radar device 10, or a bumper of a vehicle.

Figure 14:
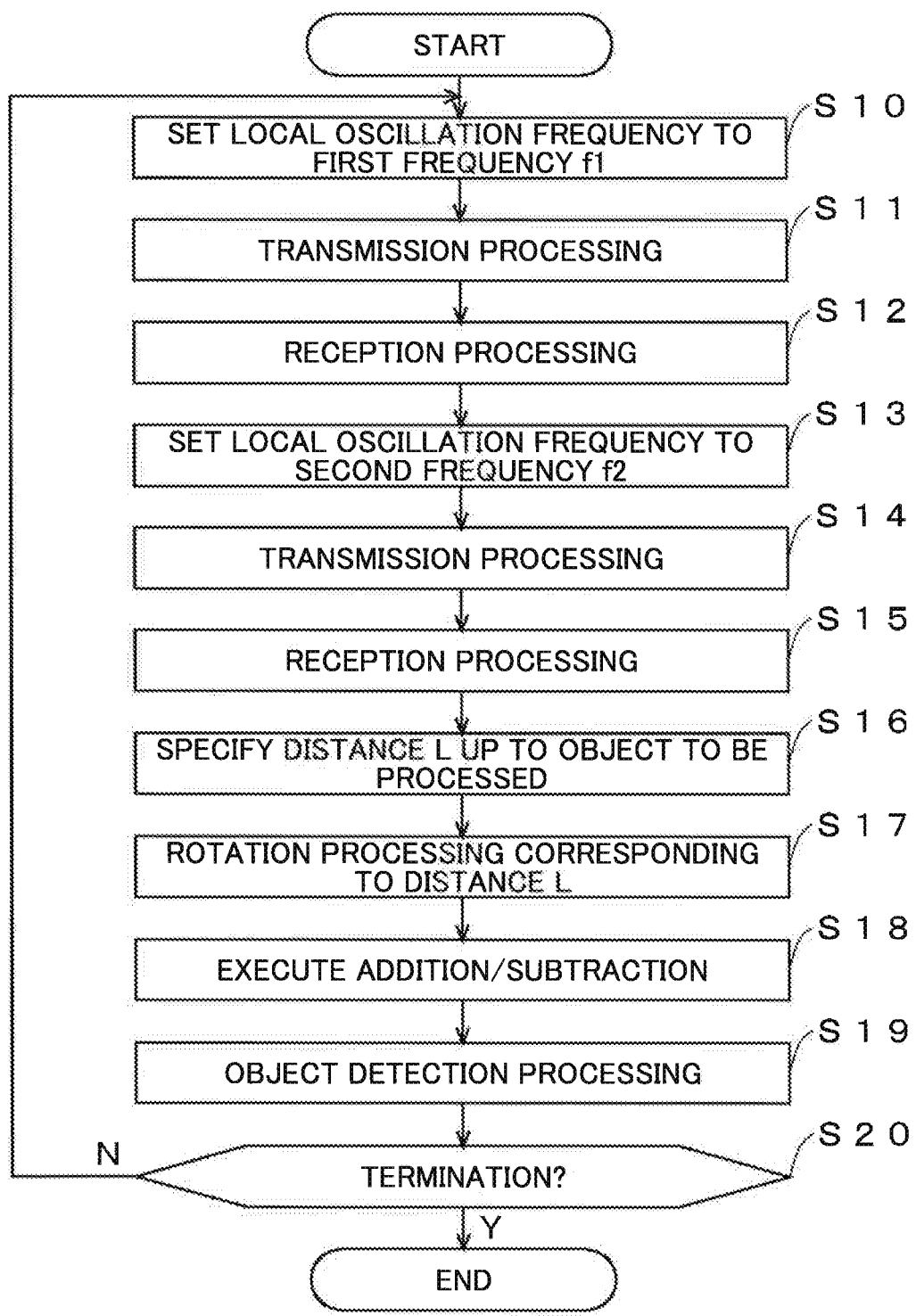
FIG. 14 is a flowchart illustrating the operation of the embodiment illustrated in FIG. 1.

Next, description will be given of a flow of the processing executed in this embodiment as illustrated in FIG. 1 with reference to FIG. 14. When processing of a flowchart illustrated in FIG. 14 is initiated, the following steps are executed.

In step S10, the control unit 11 controls the local oscillation unit 12 to set the local oscillation frequency to f1 that is the first frequency.

In step S11, the control unit 11 controls the modulation signal generation unit 13 to transmit a pulse signal. More specifically, when the control unit 11 controls the modulation signal generation unit 13, a local oscillation signal (carrier wave) of the frequency of f1 is output from the local oscillation unit 12. The modulation unit 14 modulates the carrier wave on the basis of a modulation signal output from the modulation signal generation unit 13, generates a pulse signal, and supplies the pulse signal to the amplification unit 15. The amplification unit 15 amplifies power of the pulse signal supplied from the modulation unit 14, and transmits the resultant pulse signal through the transmission antenna 16.

In step S12, reception processing is executed. More specifically, the pulse signal transmitted from the transmission antenna 16 is reflected from an object, and is captured by the reception antenna 17. An electric signal output from the reception antenna 17 is amplified by the amplification unit 18, and is supplied to the quadrature demodulation unit 20. The quadrature demodulation unit 20 down-converts the electric signal supplied from the amplification unit 18 with the local oscillation signal of the frequency f2 supplied from the local oscillation unit 12, performs quadrature modulation with respect to the electric signal, and outputs the electric signal as I and Q signals. The ADC 21 converts the I and Q signals supplied from the quadrature demodulation unit 20 into digital signals, and supplies the digital signals to the signal processing unit 22.

In step S13, the control unit 11 controls the local oscillation unit 12 to set the local oscillation frequency to f2 that is the second frequency.

In step S14, the control unit 11 controls the modulation signal generation unit 13 to transmit a pulse signal. More specifically, when the control unit 11 controls the modulation signal generation unit 13, a local oscillation signal (carrier wave) of the frequency of f2 is output from the local oscillation unit 12. The modulation unit 14 modulates the carrier wave on the basis of a modulation signal output from the modulation signal generation unit 13, generates a pulse signal, and supplies the pulse signal to the amplification unit 15. The amplification unit 15 amplifies power of the pulse signal supplied from the modulation unit 14, and transmits the resultant pulse signal through the transmission antenna 16.

In step S15, reception processing is executed. Note that, the reception processing is similar to step S12 except that the frequency of the local oscillation signal that is used by the quadrature demodulation unit 20 is f2.

In step S16, for example, the signal processing unit 22 specifies a distance L up to an object that is set as a processing target of the highlighting processing, the suppression processing, or the like. For example, in the example of FIG. 7A to FIG. 7C, since the object that is set as the suppression target is the first object, and the distance up to the first object is L1, L1 is set as the distance L. Note that, as in FIG. 3, a distance of an object (radome, a vehicle bumper, or the like) that may be a noise source may be stored in advance in the storage unit 232 as L1, and S16 may be executed on the basis of L1.

In step S17, the signal processing unit 22 executes rotation processing corresponding to the distance L. More specifically, processing of multiplying the I data and Q data by exp(−i×Δk×L1) is executed.

In step S18, the signal processing unit 22 executes processing of adding or subtracting the I data and Q data for which the rotation processing is performed. More specifically, in the case of suppressing an object, the subtraction processing is executed. In addition, in the case of highlighting the object, the addition processing is performed.

In step S19, the data processing unit 23 executes clustering processing, tracking processing, or the like on the basis of the processing result of the signal processing unit 22, and detects an object.

In step S20, the control unit 11 determines whether or not to terminate the processing, and in a case where it is determined that the processing is to be terminated (step S20: Y), the control unit 11 terminates the processing. In the other case (step S20: N), the control unit 11 returns the processing to step S10, and repeats the same processing.

According to the above-described processing, it is possible to realize the above-described operation.

(C) Description of Modified Embodiment

The above-described embodiment is illustrative only, and it is not needless to say that the invention is not limited to the above-described cases. For example, in the above-described embodiment, pulse signal of two kinds of frequencies are transmitted, and reception signals thereof are subjected to addition or subtraction, but pulse signals of three or more kinds of frequencies may be transmitted, and reception signals thereof may be subjected to addition or subtraction. Note that, even in a case where the frequencies are three or more kinds, it is possible to execute highlighting or suppression processing by the same processing as in the above-described case where the frequencies are two kinds. When transmitting a plurality of frequency signals, a frequency distribution for transmitting a pulse signal may be transitioned for every transmission, or one pulse signal may be transmitted and processing by frequency components different from each other in the pulse signal may be executed. Note that, in this case, a plurality of frequency components are simultaneously oscillated, but the addition or subtraction processing may be executed after receiving a plurality of reception signals or after simultaneously receiving the plurality of reception signals.

In addition, in the above-described embodiment, description has been given with reference to the radar device 10 that transmits the pulse signal, but the invention is also applicable to, for example, a radar device of a frequency modulated continuous wave (FMCW) type.

Figure 15:
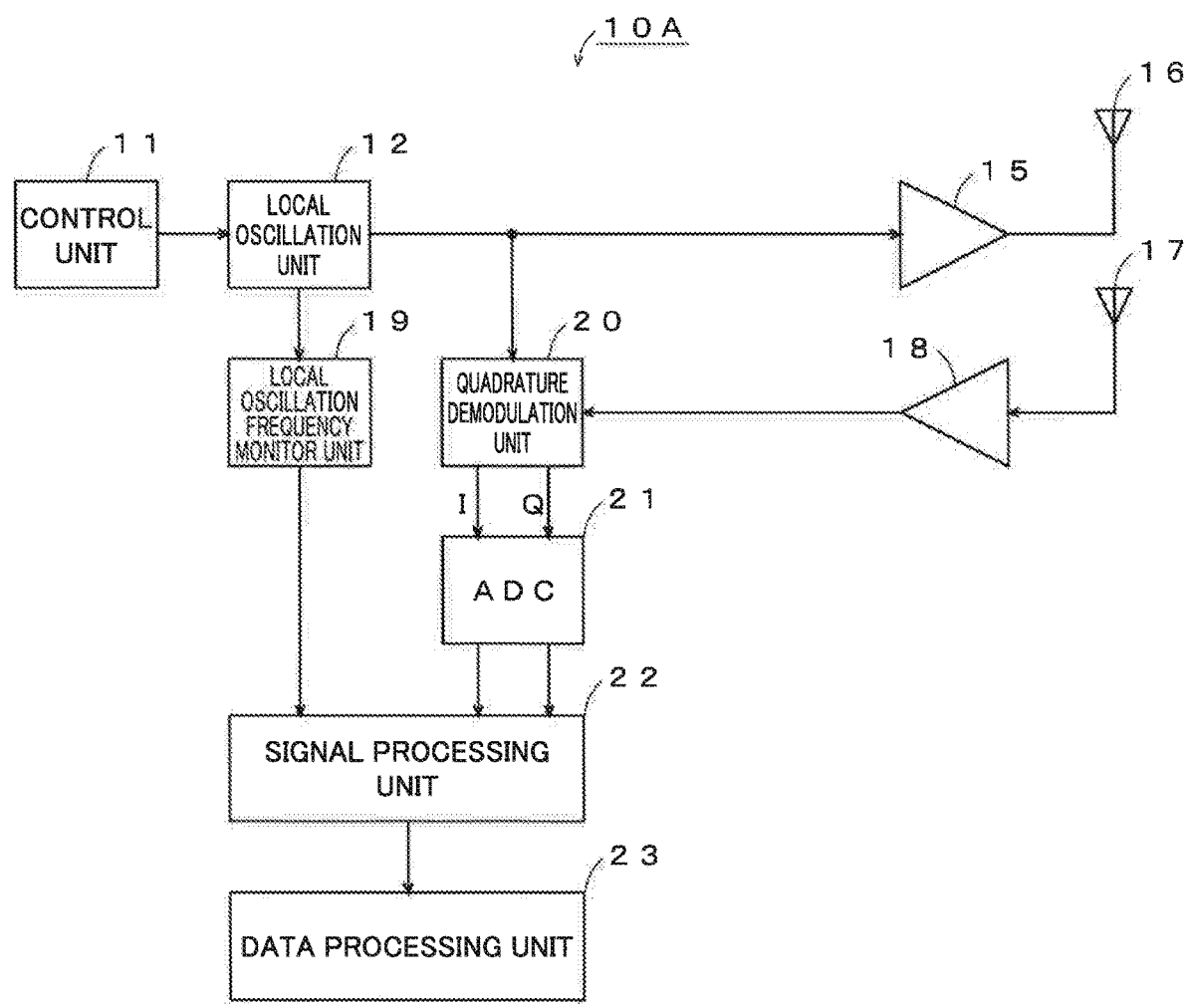
FIG. 15 is a diagram illustrating a configuration example of a modified embodiment of the invention.

FIG. 15 is a diagram illustrating a configuration example of an FMCW type radar device 10A. Note that, in FIG. 15, the same reference numeral will be given to a portion correspond to FIG. 1, and description thereof will be omitted. In FIG. 15, when being compared with FIG. 1, the modulation signal generation unit 13 and the modulation unit 14 are excluded. The other configurations are similar to FIG. 1.

In the radar device 10A illustrated in FIG. 15, a frequency-modulated continuous wave is transmitted, and a distance is obtained from a difference between frequencies of a transmission wave and a reception wave. In the radar device 10A, since the frequency-modulated transmission signal is used, it is possible to highlight or suppress a desired component by performing desired rotation processing with respect to a reception signal, and by adding or subtracting an obtained signal.

Figure 16:
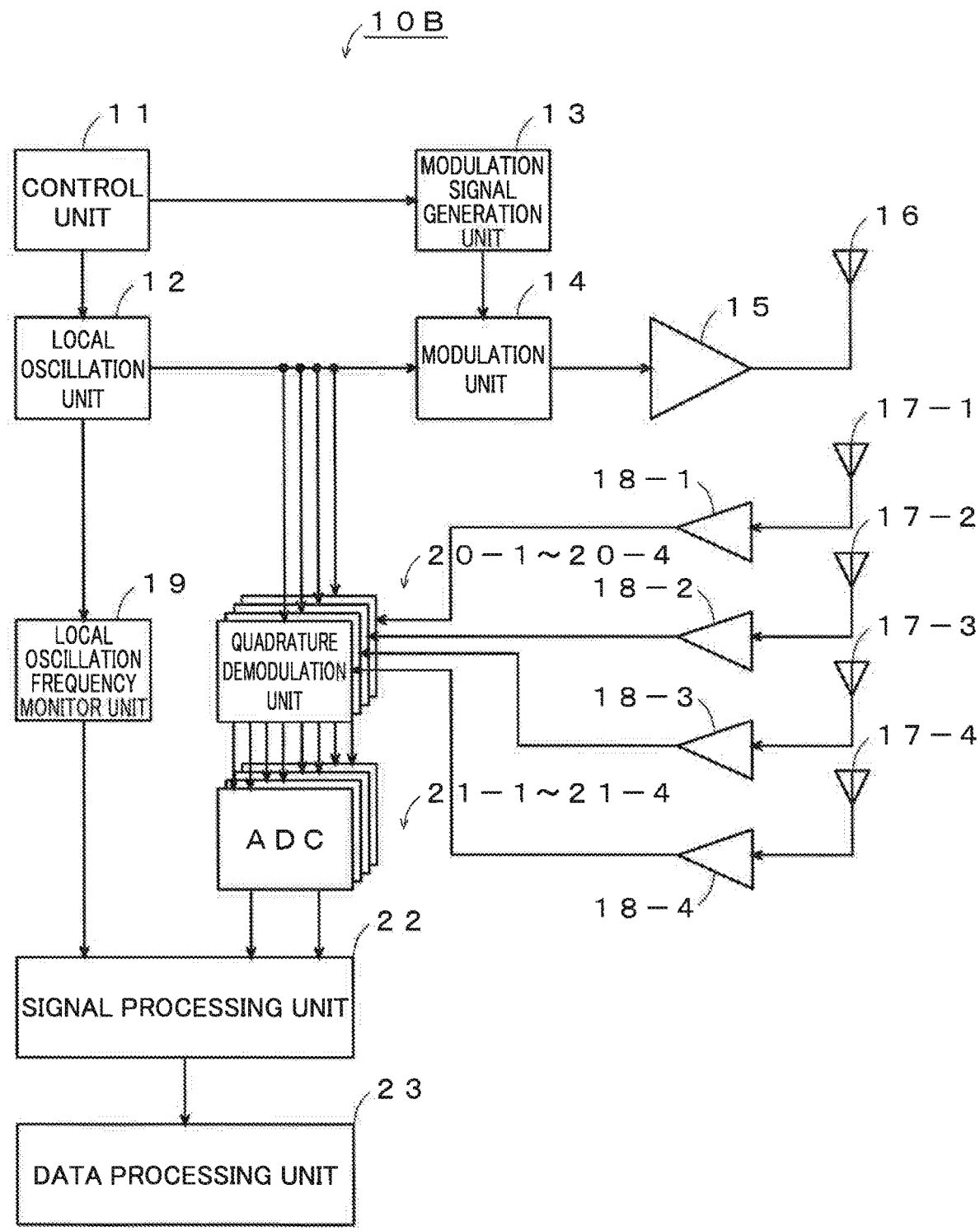
FIG. 16 is a diagram illustrating an operation of a modified embodiment of the invention.

In addition, in the above-described embodiment, description has been given of a case where one piece of the transmission antenna 16 and one piece of the reception antenna 17 are provided as an example, but for example, as illustrated in FIG. 16, one piece of the transmission antenna 16 and a plurality of pieces (four in this example) of reception antennas 17-1 to 17-4 may be provided. That is, a radar device 10B illustrated in FIG. 16 is different from the embodiment illustrated in FIG. 1 in that four reception antennas 17-1 to 17-4, four amplification units 18-1 to 18-4, four quadrature demodulation units 20-1 to 20-4, and four ADC 21-1 to 21-4 are provided. Note that, in the embodiment illustrated in FIG. 16, the four reception antennas 17-1 to 17-4 are arranged with predetermined intervals in a horizontal direction, and it is possible to detect an angle of an object in the horizontal direction from a time difference between reflection signals received by the reception antennas. In addition, even in the embodiment illustrated in FIG. 16, it is possible to suppress or highlight an arbitrary object by performing the same processing as in the above-described case with respect to reflection signals received by the reception antennas 17-1 to 17-4. Note that, it is not needless to say that the number of the reception antennas may be other than four pieces.

Figure 17:
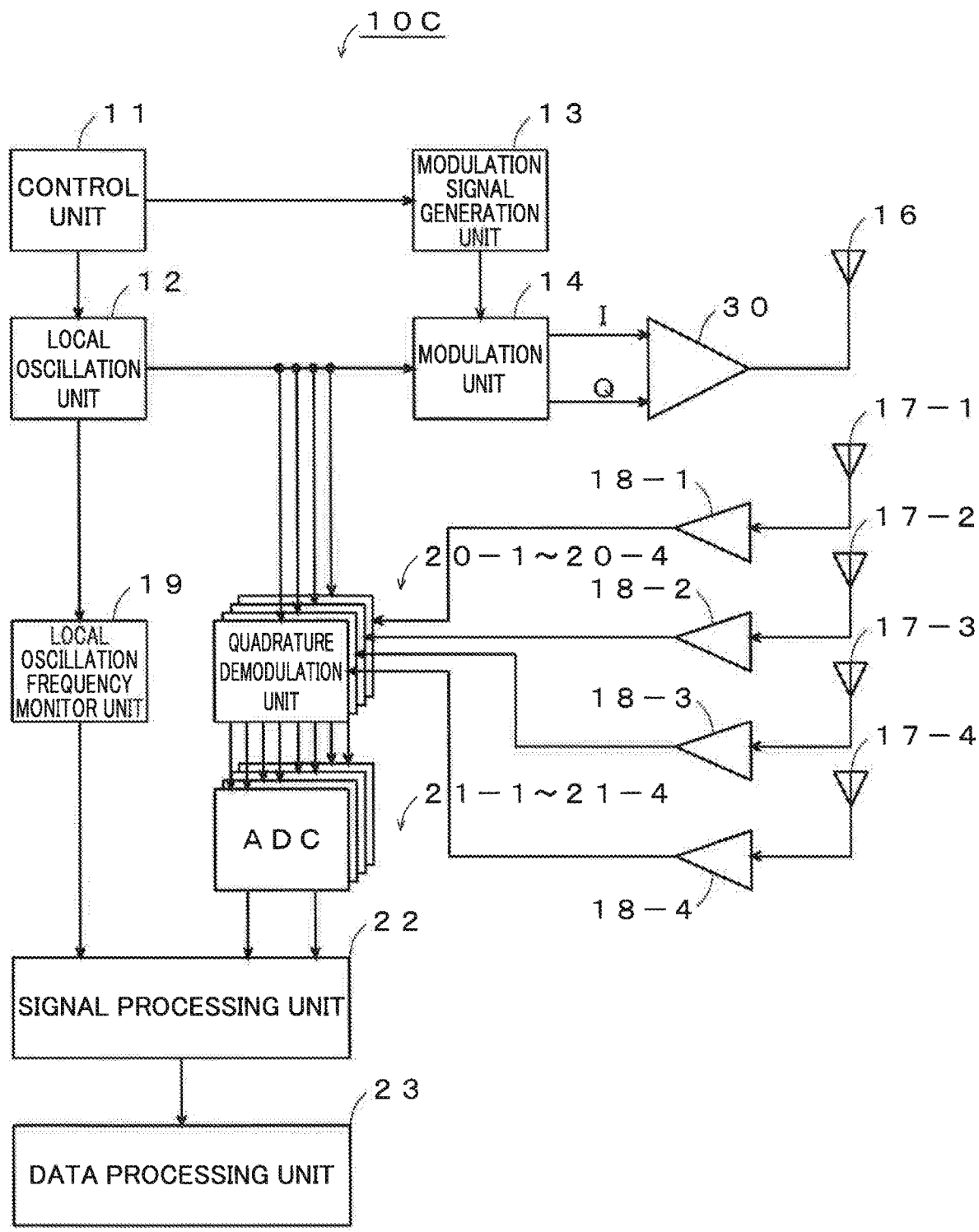
FIG. 17 is a diagram illustrating a configuration example of a modified embodiment of the invention.

In addition, FIG. 17 illustrates a case where a transmission signal is subjected to quadrature modulation. That is, a radar device 10C illustrated in FIG. 17 is different from FIG. 16 in that a signal output from the modulation unit 14 is subjected to quadrature modulation. The other configurations are the same as in FIG. 16. As described above, the invention is applicable to a case where the transmission signal is subjected to the quadrature modulation.

Figure 18:
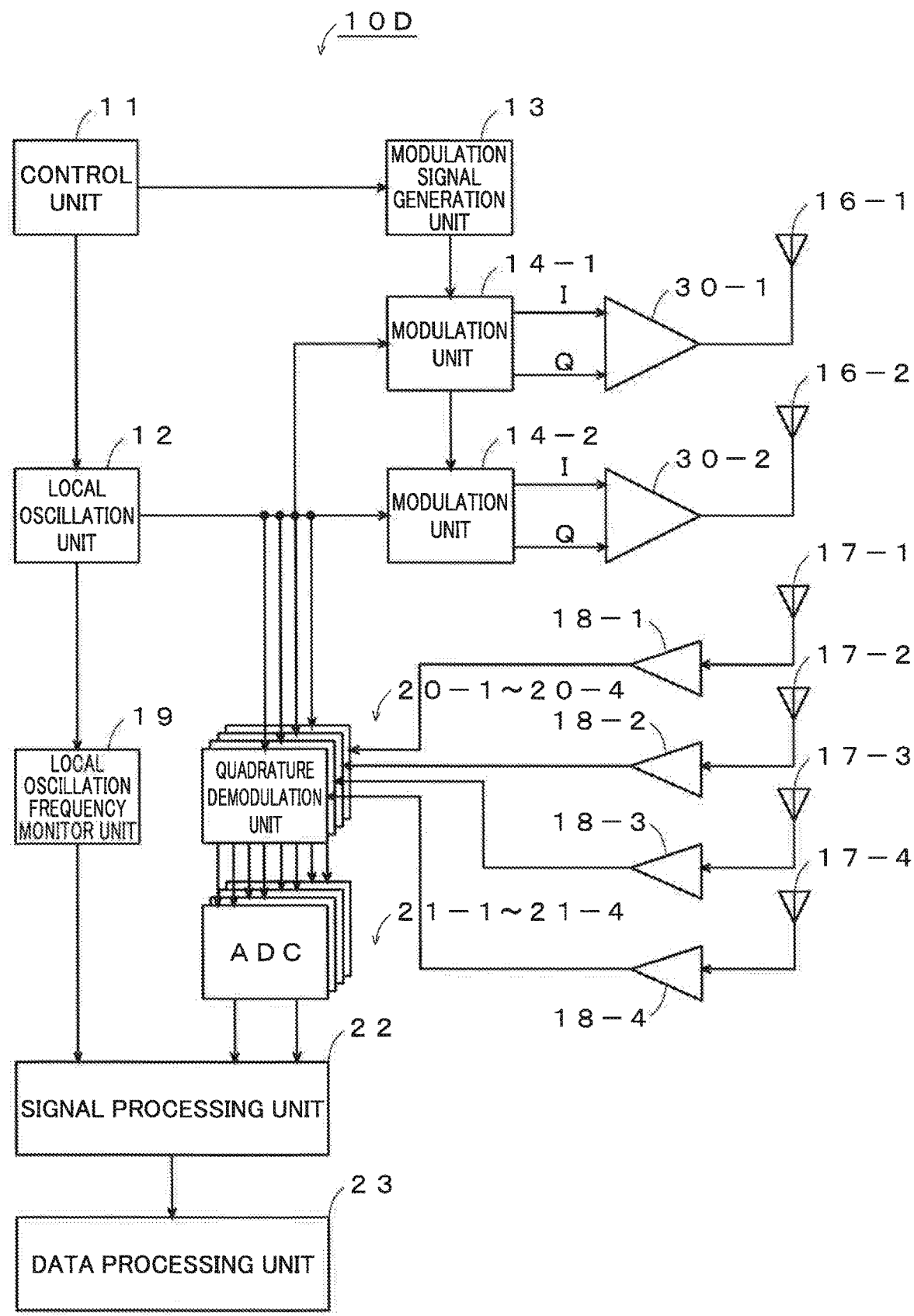
FIG. 18 is a diagram illustrating a configuration example of a modified embodiment of the invention.

In addition, FIG. 18 illustrates a configuration example in a case where two transmission antennas 16-1 and 16-2 are provided. In a radar device 10D illustrated in FIG. 18, the transmission antennas 16-1 and 16-2 are arranged with a predetermined distance in a horizontal direction as in the reception antennas 17-1 to 17-4. As described above, when a plurality of the transmission antennas 16-1 and 16-2 are provided, virtual antennas can be realized, and thus it is possible to expect the same function as in a case where eight pieces of the reception antennas 17-1 to 17-4 virtually exist. Note that, the invention is also applicable to the radar device 10D illustrated in FIG. 18.

Figure 19:
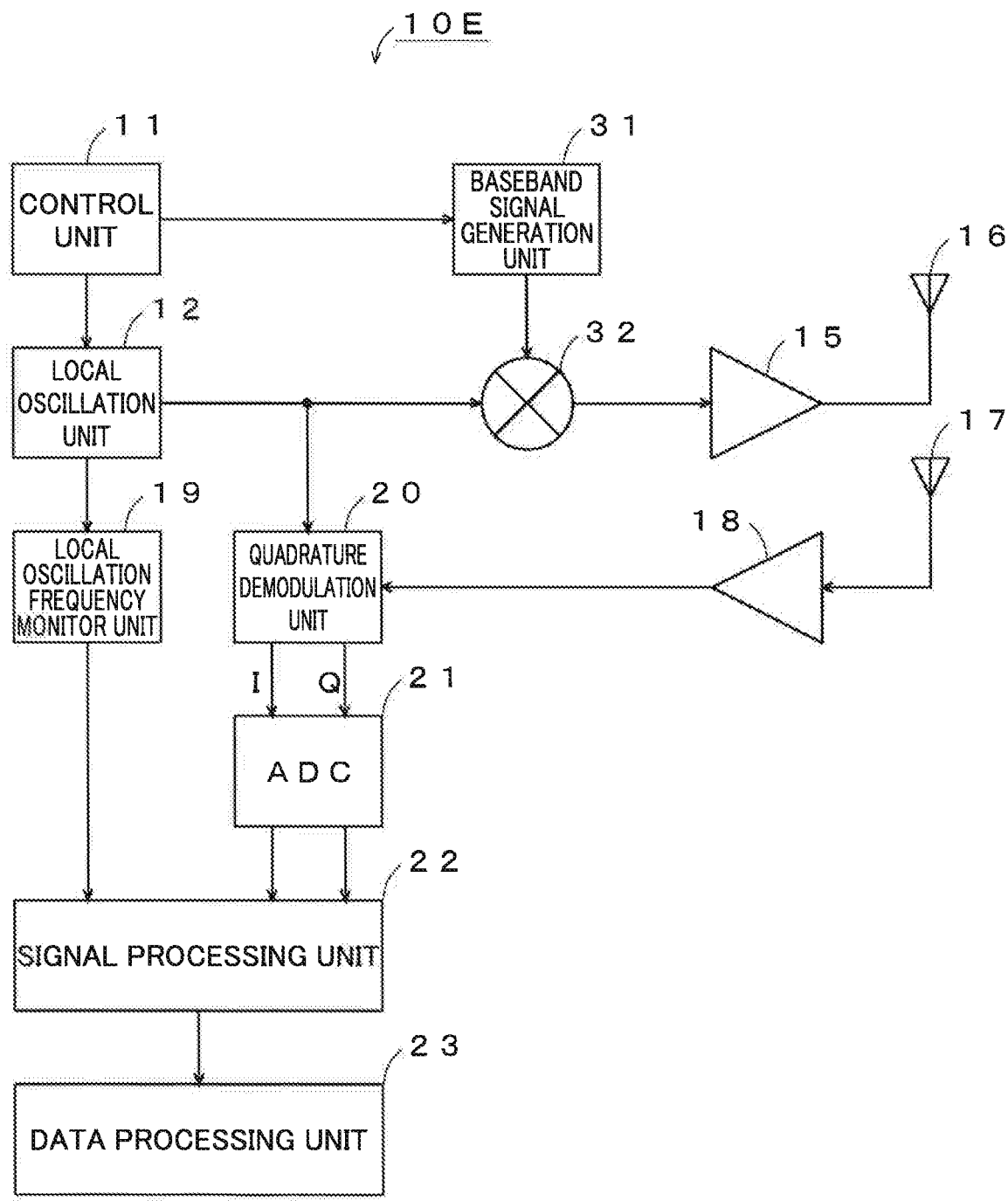
FIG. 19 is a diagram illustrating a configuration example of a modified embodiment of the invention.

In addition, FIG. 19 illustrates a configuration example in which the modulation signal generation unit 13 illustrated in FIG. 1 is substituted with a baseband signal generation unit 31, and the modulation unit 14 is substituted with a multiplication unit 32. In the example illustrated in FIG. 19, a pulse-shaped signal is generated by the baseband signal generation unit 31, and is multiplied by a local oscillation signal supplied form the local oscillation unit 12 by the multiplication unit 32, and a signal obtained by modulating the local oscillation signal to a pulse shape is output. The invention is also applicable to a radar device 10E having such a configuration illustrated in FIG. 19.

Figure 20A:
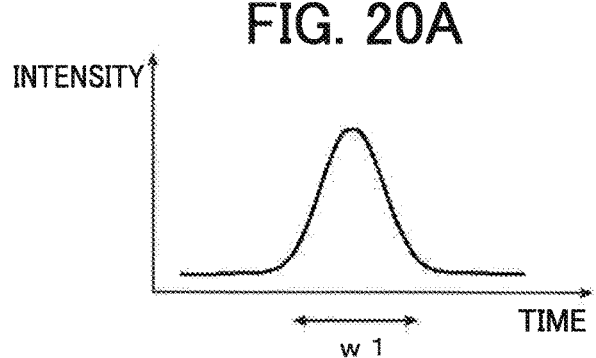
FIG. 20A is graphs illustrating a configuration example of a modified embodiment of the invention.
Figure 20B:
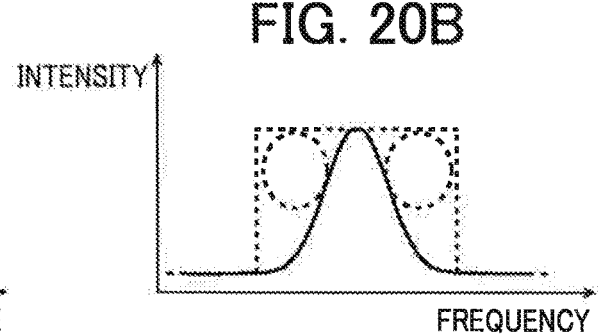
FIG. 20B is graphs illustrating a configuration example of a modified embodiment of the invention.
Figure 20C:
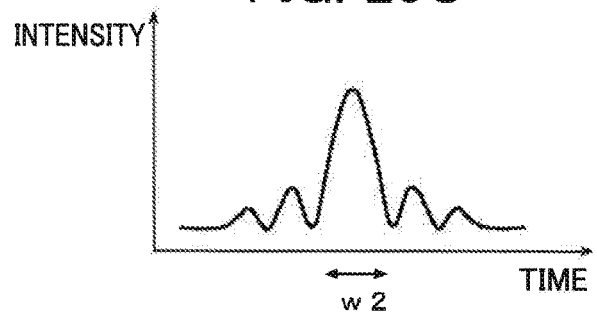
FIG. 20C is graphs illustrating a configuration example of a modified embodiment of the invention.

In addition, in the above-described embodiments, it is assumed that a Gaussian function type pulse signal illustrated in FIG. 20A is used as the waveform of the transmission pulse signal, but for example, a Sinc function type pulse signal illustrated in FIG. 20C may be used.

Figure 20D:
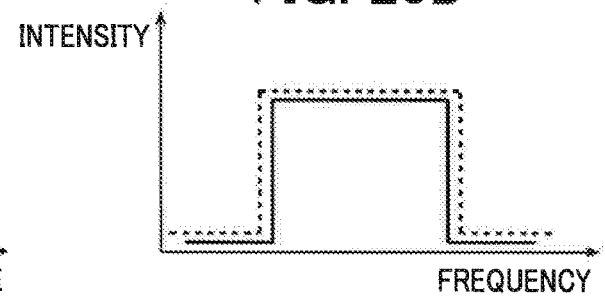
FIG. 20D is graphs illustrating a configuration example of a modified embodiment of the invention.

More specifically, in the case of the Gaussian function type pulse signal having a Gaussian function type waveform in a time region as illustrated in FIG. 20A, the pulse signal also has a Gaussian function type waveform even in a frequency region as illustrated in FIG. 20B. Accordingly, a spectrum mask indicated by a broken line in the graph is not sufficiently used, and thus a width w1 of a pulse waveform in the time region is broadened. On the other hand, in the case of the Sinc function type pulse signal illustrated in FIG. 20C, as illustrated in FIG. 20D, the spectrum mask indicated by a broken line in the graph is sufficiently used, and thus it is possible to make a width w2 of the pulse waveform narrower than w1.

Note that, in the related art, in the case of using the Sinc function type pulse signal illustrated in FIG. 20C, the pulse has a plurality of peaks, and thus a plurality of objects are erroneously detected in the peaks. On the other hand, in the embodiments, when one of components corresponding to the respective peaks is suppressed by the above-described processing, a component from another peak is a reflection signal from the same object, and thus the component is also suppressed. Accordingly, even in the case of using a multi-peak type pulse waveform in which a plurality of peaks are present, it is possible to prevent erroneous detection. In addition, since the pulse signal in which the width w2 is narrow is used, for example, when detecting a distance up to an object by time of flight (TOF), it is possible to improve distance resolution.

In addition, in the above-described embodiments, description has been given with reference to automatic four-wheeled vehicle as an example of a vehicle, but an automatic two-wheeled vehicle, a bicycle, or the like may be detected. That is, in this specification, the vehicle is not limited to the automatic four-wheeled vehicle.

In addition, the processing of the flowchart illustrated in FIG. 14 is illustrative only, and it is needless to say that the invention is not limited to processing of the flowchart.

In addition, in the above-described embodiments, rotation is made to a phase angle corresponding to any one object among a plurality of objects and a frequency, but rotation may be made to an arbitrary phase angle. For example, in the above-described examples, Expression (3) is multiplied by $\exp(-i \times \Delta k \times L1)$, but rotation may be made to a phase angle including a distance other than L1 and L2.

In addition, a detection result of an object by the above-described embodiments may be supplied to, for example, an ECU that controls a vehicle, and the ECU may control (change) a vehicle state. For example, a vehicle speed may be decreased by controlling a brake on the basis of the detection result of the object, the vehicle speed may be increased by controlling an accelerator on the basis of the detection result, or an advancing direction of the vehicle may be changed by controlling a steering wheel.

In addition, for example, the signal processing unit 22 and the data processing unit 23 is constituted by one or a plurality of central processing units (CPU), read only memories (ROM), random access memories (RAM), interfaces (I/F), and the like, and when the CPU executes a command group stored in the ROM or the RAM, the above-described processing is realized. Note that, for example, the signal processing unit 22 and the data processing unit 23 may be constituted by one or a plurality of digital signal processor (DSP), complex programmable logic devices (CPLD), field programmable gate arrays (FPGA), application specific integrated circuits (ASIC), or the like instead of the CPU.

Hereinafter, additional statements are added.

(Additional Statement 1)

A radar device comprising:

a transmission circuit that transmits at least a first transmission signal having a first frequency and a second transmission signal having a second frequency different from the first frequency;

a reception circuit that receives the first transmission signal and the second transmission signal which are transmitted by the transmission circuit and are reflected by one or a plurality of objects as a first reception signal and a second reception signal; and a processor; and a memory that stores a command group executable by the processor that executes following operations in a case of being executed by the processor, wherein quadrature demodulation is performed with respect to each of the first reception signal and the second reception signal which are output from the reception circuit, at least one of the first reception signal and the second reception signal which are subjected to the quadrature demodulation is rotated on an IQ plane in correspondence with a predetermined phase angle corresponding to a predetermined distance, and the first frequency or the second frequency, the first reception signal and the second reception signal of which at least one is rotated is added or subtracted, the one or plurality of objects are detected on the basis of a result of the addition or subtraction, and information relating to the one or plurality of objects which are detected is output.

(Additional Statement 2)

The radar device according to Additional Statement 1, wherein the processor executes processing of adding the first reception signal and the second reception signal of which at least one is rotated so as to highlight a predetermined object among the one or plurality of objects.

(Additional Statement 3)

The radar device according to Additional Statement 1, wherein the processor executes processing of subtracting the first reception signal and the second reception signal of which at least one is rotated so as to suppress a predetermined object among the one or plurality of objects.

(Additional Statement 4)

The radar device according to Additional Statement 2, wherein the memory stores information indicating a phase to be rotated with respect to each of the one or plurality of objects, and the processor rotates a phase of at least one of the first reception signal and the second reception signal on the basis of the information.

(Additional Statement 5)

The radar device according to Additional Statement 1, wherein the reception circuit receives inflow signals of the first transmission signal and the second transmission signal from the transmission circuit to the reception circuit as the first reception signal and the second reception signal respectively, the memory stores information indicating a phase to be rotated with respect to the inflow signals, and the processor rotates a phase of at least one of the first reception signal and the second reception signal on the basis of the information, and executes processing of calculating a difference between the first reception signal and the second reception signal of which at least one is rotated so as to suppress the inflow signals.

(Additional Statement 6)

The radar device according to Additional Statement 5, wherein the one or plurality of objects include a bumper of a vehicle.

(Additional Statement 7)

The radar device according to Additional Statement 1, wherein a transmission signal transmitted from the transmission circuit is a multi-peak type transmission signal in which a signal in a time region has a plurality of peaks.

(Additional Statement 8)
The radar device according to Additional Statement 7, wherein the multi-peak type transmission signal has a Sinc function type waveform.

(Additional Statement 9)
The radar device according to Additional Statement 1, wherein the radar device is mounted on a vehicle, the processor outputs information obtained by executing processing of highlighting or suppressing a predetermined object among the one or plurality of objects existing at the periphery of the vehicle to an electronic control device, and the electronic control device changes an operation of the vehicle.

(Additional Statement 10)
A radar device comprising:
a transmission circuit that transmits at least a first transmission signal having a first frequency and a second transmission signal having a second frequency different from the first frequency;
a reception circuit that receives the first transmission signal and the second transmission signal which are transmitted by the transmission circuit and are reflected by one or a plurality of objects as a first reception signal and a second reception signal;
a processor; and
a memory that stores a command group executable by the processor that executes following operations in the case of being executed by the processor,
wherein predetermined processing is performed with respect to each of the first reception signal and the second reception signal which are output from the reception circuit,
a predetermined object among the one or plurality of objects is highlighted or suppressed, and obtained information is output.

(Additional Statement 11)
An object detecting method for a radar device, comprising:
transmitting at least a first transmission signal having a first frequency and a second transmission signal having a second frequency different from the first frequency by a transmission circuit;
receiving the first transmission signal and the second transmission signal which are transmitted by the transmission circuit and are reflected by one or a plurality of objects as a first reception signal and a second reception signal by a reception circuit;
performing quadrature demodulation with respect to each of the first reception signal and the second reception signal which are output from the reception circuit by a system including a processor;
rotating at least one of the first reception signal and the second reception signal which are subjected to the quadrature demodulation on an IQ plane by the system in correspondence with a predetermined phase angle corresponding to a distance up to a predetermined object among the one or plurality of objects, and the first frequency or the second frequency;
adding or subtracting the first reception signal and the second reception signal of which at least one is rotated by the system;
detecting the one or plurality of objects by the system on the basis of a processing result of the addition or subtraction;
information relating to the one or plurality of objects which are detected is output.

EXPLANATION OF REFERENCE NUMERALS 10, 10A TO 10E RADAR DEVICE
11 CONTROL UNIT
12 LOCAL OSCILLATION UNIT
13 MODULATION SIGNAL GENERATION UNIT
14 MODULATION UNIT
15, 18 AMPLIFICATION UNIT
16 TRANSMISSION ANTENNA
17 RECEPTION ANTENNA
18 AMPLIFICATION UNIT
19 LOCAL OSCILLATION FREQUENCY MONITOR UNIT
20 QUADRATURE DEMODULATION UNIT
21 ADC
22 SIGNAL PROCESSING UNIT
23 DATA PROCESSING UNIT
31 BASEBAND SIGNAL GENERATION UNIT
32 MULTIPLICATION UNIT
221 ARITHMETIC OPERATION UNIT
222 STORAGE UNIT
223 DATA STORAGE UNIT

The invention claimed is:
1. A radar device, comprising:
a transmission circuit configured to transmit at least a first transmission signal having a first frequency and a second transmission signal having a second frequency different from the first frequency;
a reception circuit configured to receive the first transmission signal and the second transmission signal, which are transmitted by the transmission circuit and are reflected by one or more objects, as a first reception signal and a second reception signal;
a memory that stores a predetermined distance to a particular object of the one or more objects; and
circuitry configured to
perform a quadrature demodulation with respect to each of the first reception signal and the second reception signal output from the reception circuit,
rotate at least one of the first reception signal and the second reception signal, which are subjected to the quadrature demodulation, on an IQ plane by a phase angle determined by multiplying a difference in waxen hers corresponding to the first and second frequencies by the predetermined distance stored in the memory,
add or subtract the first reception signal and the second reception signal, of which at least one is rotated,
detect the one or more objects based on a result of the addition or subtraction, and
output information relating to the detected one or more objects.

2. The radar device according to claim 1, wherein the circuitry is further configured to add the first reception signal and the second reception signal, of which at least one is rotated, so as to highlight a predetermined object among the one or more objects.

3. The radar device according to claim 1, wherein the circuitry is further configured to subtract the first reception signal and the second reception signal, of which at least one is rotated, so as to suppress a predetermined object among the one or more objects.

4. The radar device according to claim 2,
wherein the memory further stores information indicating a phase to be rotated with respect to each of the one or more objects,
wherein the circuitry is further configured to rotate a phase of at least one of the first reception signal and the second reception signal based on the stored information.

5. The radar device according to claim 1,
wherein the reception circuit is further configured to receive inflow signals of the first transmission signal and the second transmission signal from the transmission circuit to the reception circuit as the first reception signal and the second reception signal respectively,
the memory further stores information indicating a phase to be rotated with respect to the inflow signals, and
the circuitry is further configured to rotate a phase of at least one of the first reception signal and the second reception signal based on the information, and calculate a difference between the first reception signal and the second reception signal, of which at least one is rotated, so as to suppress the inflow signals.

6. The radar device according to claim 5, wherein the reception circuitry is further configured to receive the first and second transmission signals, which are reflected from the one or more objects, which include a bumper of a vehicle.

7. The radar device according to claim 1, wherein the transmission circuit is further configured to transmit a transmission signal that is a multi-peak type transmission signal in which a signal in a time region has a plurality of peaks.

8. The radar device according to claim 7,
wherein the transmission circuit is further configured to transmit the multi-peak type transmission signal, which has a Sinc function type waveform.

9. The radar device according to claim 1, wherein the radar device is mounted on a vehicle,
the circuitry is further configured to output information obtained by executing processing of highlighting or suppressing a predetermined object among the one or more objects existing at a periphery of the vehicle to an electronic control device, and
the electronic control device is configured to change an operation of the vehicle.

10. A radar device, comprising:
a transmission circuit configured to transmit at least a first transmission signal having a first frequency and a second transmission signal having a second frequency different from the first frequency;
a reception circuit configured to receive the first transmission signal and the second transmission signal, which are transmitted by the transmission circuit and are reflected by one or more objects as a first reception signal and a second reception signal; and
circuitry configured to
perform a quadrature demodulation with respect to each of the first reception signal and the second reception signal output from the reception circuit;
rotate at least one of the first reception signal and the second reception signal, which are subjected to the quadrature demodulation, on an IQ plane by a phase angle;
add the first reception signal and the second reception signal, of which at least one is rotated, so as to highlight a predetermined object among the one or more objects;
and
output obtained information relating to the highlighted predetermined object.

11. An object detecting method for a radar device, comprising:
transmitting, by a transmission circuit, al least a first transmission signal having a first frequency and a second transmission signal having a second frequency different from the first frequency;
receiving, by a reception circuit, the first transmission signal and the second transmission signal, which are transmitted by the transmission circuit and are reflected by one or more objects, as a first reception signal and a second reception signal;
performing, by circuity, a quadrature demodulation with respect to each of the first reception signal and the second reception signal output from the reception circuit;
storing, in a memory, a predetermined distance to a particular object of the one or more objects;
rotating at least one of the first reception signal and the second reception signal, which are subjected to the quadrature demodulation, on an IQ plane by a phase angle determined by multiplying a difference in wavenumbers corresponding to the first and second frequencies by the predetermined distance stored in the memory;
adding or subtracting the first reception signal and the second reception signal, of which at least one is rotated;
detecting the one or more objects based on a processing result of the addition or subtraction; and
outputting information relating to the detected one or more objects.

* * * * *